United States Patent [19]

Carlson et al.

[11] 4,444,912
[45] Apr. 24, 1984

[54] PHENOLIC FOAM AND COMPOSITION AND METHOD FOR PREPARING THE SAME

[75] Inventors: John D. Carlson, Bradford Woods; Edward W. Kifer, Trafford; Vincent J. Wojtyna, Lyndora; James P. Colton, Monroeville, all of Pa.

[73] Assignee: Koppers Company, Inc., Pittsburgh, Pa.

[21] Appl. No.: 396,706

[22] Filed: Jul. 9, 1982

Related U.S. Application Data

[63] Continuation-in-part of Ser. No. 282,021, Jul. 10, 1981, abandoned.

[51] Int. Cl.$^3$ .............................................. C08J 9/14
[52] U.S. Cl. ..................................... 521/121; 521/133; 521/181
[58] Field of Search ........................ 521/121, 181, 133

[56] References Cited

U.S. PATENT DOCUMENTS

| | | | |
|---|---|---|---|
| 2,446,429 | 8/1948 | Nelson et al. | 521/117 |
| 2,653,139 | 9/1953 | Sterling | 521/106 |
| 2,728,741 | 12/1955 | Simon et al. | 525/58 |
| 2,933,461 | 4/1960 | Mullen | 521/117 |
| 2,979,469 | 4/1961 | Shannon et al. | 521/116 |
| 3,271,331 | 9/1966 | Ender | 521/112 |
| 3,298,973 | 1/1967 | Quarles et al. | 521/112 |
| 3,336,243 | 8/1967 | Garrett | 521/88 |
| 3,389,094 | 6/1968 | D'Alessandro | 521/114 |
| 3,389,095 | 6/1968 | Garrett | 521/53 |
| 3,484,391 | 12/1969 | Wheatley et al. | 521/181 |
| 3,639,303 | 2/1972 | Penfold | 521/181 |
| 3,640,911 | 2/1972 | Papa et al. | 521/181 |
| 3,673,130 | 6/1972 | Papa et al. | 521/107 |
| 3,692,706 | 9/1972 | Graham et al. | 521/106 |
| 3,694,387 | 9/1972 | Junger et al. | 521/103 |
| 3,726,708 | 4/1973 | Weissenfels et al. | 428/320.2 |
| 3,740,358 | 6/1973 | Christie et al. | 521/103 |
| 3,741,920 | 6/1973 | Weissenfels et al. | 521/116 |
| 3,821,337 | 6/1974 | Bunclark et al. | 264/26 |
| 3,830,894 | 8/1974 | Juenger et al. | 264/41 |
| 3,835,208 | 9/1974 | Koutitonsky | 264/45.5 |
| 3,842,020 | 10/1974 | Garrett | 521/54 |
| 3,862,912 | 1/1975 | Berndt et al. | 521/88 |
| 3,870,661 | 3/1975 | Crook et al. | 521/110 |
| 3,872,033 | 3/1975 | Boden et al. | 521/181 |
| 3,876,620 | 4/1975 | Moss | 528/155 |
| 3,877,967 | 4/1975 | Junger et al. | 428/318.4 |
| 3,885,010 | 5/1975 | Bruning et al. | 264/46.2 |
| 3,907,723 | 9/1975 | Pretot | 521/112 |
| 3,915,772 | 10/1975 | Weissenfels et al. | 156/79 |
| 3,953,645 | 4/1976 | Moss | 428/304.4 |
| 3,968,300 | 7/1976 | Moss et al. | 428/304.4 |
| 3,998,765 | 12/1976 | Novak et al. | 521/121 |
| 3,999,230 | 12/1976 | Bruning et al. | 425/149 |
| 4,001,148 | 1/1977 | Simic et al. | 521/106 |
| 4,018,725 | 4/1977 | Hadley | 521/131 |
| 4,033,909 | 7/1977 | Papa | 521/131 |
| 4,033,910 | 7/1977 | Papa | 521/131 |
| 4,042,314 | 8/1977 | Bruning et al. | 425/89 |
| 4,048,145 | 9/1977 | Moss | 528/155 |
| 4,067,829 | 1/1978 | Garrett | 521/91 |
| 4,070,313 | 1/1978 | Papa | 521/110 |
| 4,102,832 | 7/1978 | Weissenfels et al. | 521/103 |
| 4,107,107 | 8/1978 | Mendelsohn et al. | 521/106 |
| 4,111,911 | 9/1978 | Weissenfels et al. | 524/405 |
| 4,119,584 | 10/1978 | Papa et al. | 521/127 |
| 4,122,045 | 10/1978 | Garrett et al. | 521/45 |
| 4,133,931 | 1/1979 | Beale et al. | 428/305.5 |

FOREIGN PATENT DOCUMENTS

| | | |
|---|---|---|
| 674181 | 11/1963 | Canada . |
| 866876 | 3/1971 | Canada . |
| 1026068 | 2/1978 | Canada . |
| 1272857 | 5/1972 | United Kingdom . |
| 1275871 | 5/1972 | United Kingdom . |
| 1414506 | 11/1975 | United Kingdom . |
| 1488527 | 10/1977 | United Kingdom . |
| 1566109 | 4/1980 | United Kingdom . |

*Primary Examiner*—Morton Foelak
*Attorney, Agent, or Firm*—Herbert J. Zeh, Jr.

[57] ABSTRACT

Closed-cell phenolic foam having a uniform cell structure in which the cell walls are substantially free of both ruptures and perforations is disclosed. The phenolic foam has initial k values of less than 0.15 with substantially no increase of k value over time and good density and compressive strengths. The phenolic foam is prepared by foaming and curing a foamable phenolic resole composition containing an aqueous phenol formaldehyde resole, surfactant, fluorocarbon blowing agent, and optionally other additives with an acid foaming and curing catalyst in a substantially closed mold which exerts a restraining pressure on the foaming composition in excess of ambient atmospheric pressure of greater than about 3 pounds per square inch. The aqueous phenol formaldehyde resole is essentially a phenol formaldehyde condensation polymer having a molar ratio of formaldehyde to phenol of from about 1.7:1 to 2.3:1, preferably from 1.75:1 to 2.25:1 and most preferably about 2:1. The resole has a weight average molecular weight greater than 800 and preferably from 950–1500. The resole also has a number average molecular weight greater than about 350 and preferably from about 400 to about 600 and a dispersivity greater than about 1.7, preferably from 1.8 to 2.6. The acid foaming and curing catalyst is an anhydrous aryl sulfonic acid having a pKa less than about 2.0 and which changes the compatibility of the phenolic resole with water. The preferred anhydrous aryl sulfonic acid is a combination of toluene sulfonic acid and xylene sulfonic acid.

45 Claims, 36 Drawing Figures

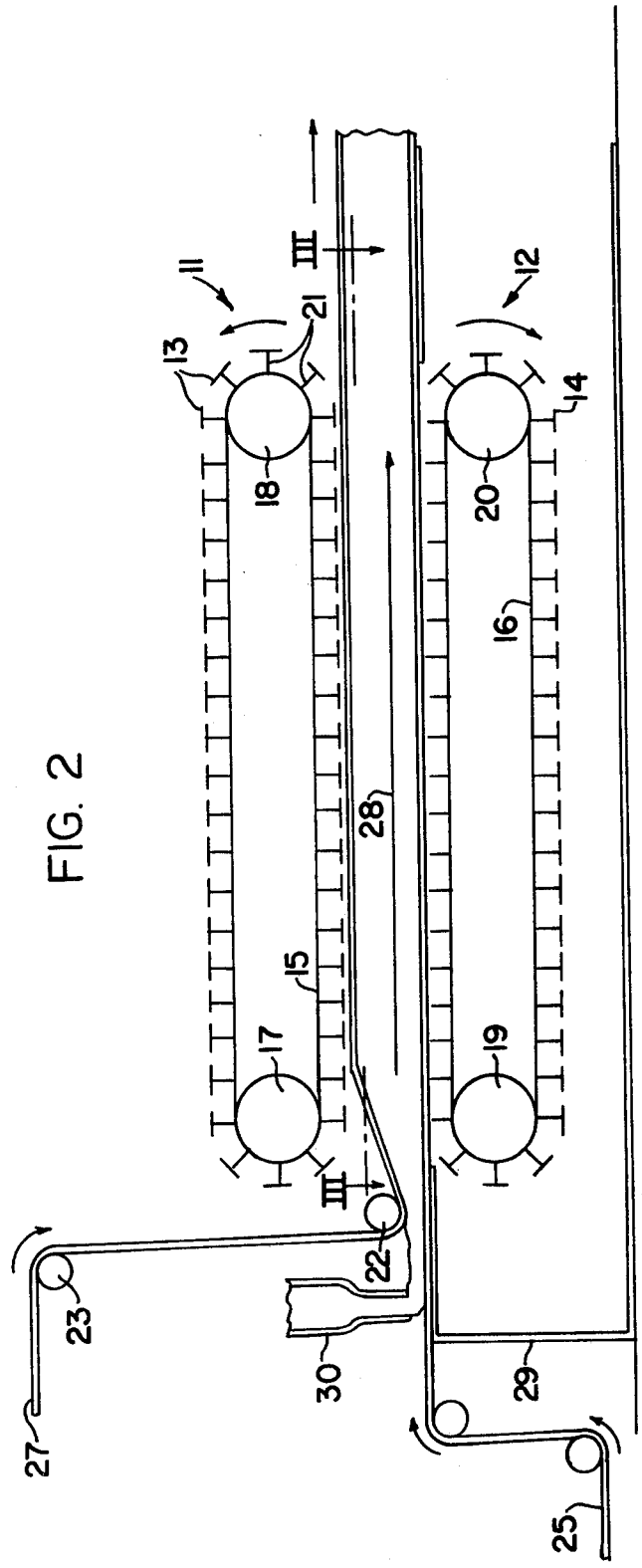
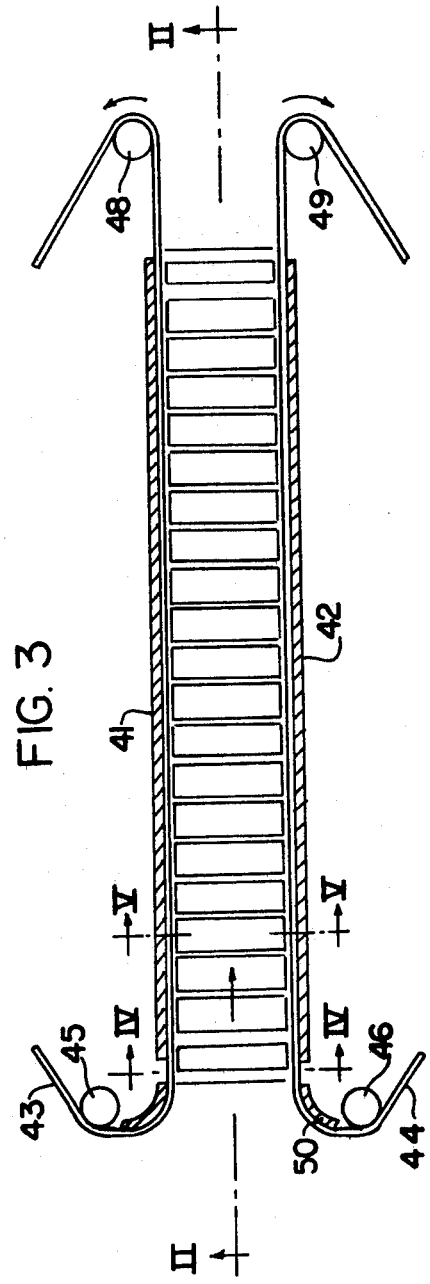

PHENOLIC FOAM AND COMPOSITION AND METHOD FOR PREPARING THE SAME

CROSS-REFERENCE TO RELATED APPLICATIONS

This application is a continuation-in-part of U.S. Application Ser. No. 282,021, filed July 10, 1981 abandoned.

BACKGROUND OF THE INVENTION

1. Field of the Invention

This invention relates to improved phenolic foam having a uniform closed-cell structure with cells substantially free of both ruptures and perforations. The phenolic foam has improved thermal insulation properties and compressive strength. The invention also relates to a method for preparing the improved phenolic foam by curing and foaming a foamable phenolic resole composition with certain anhydrous aryl sulfonic acid catalysts in a substantially closed mold under restraining pressures of at least about 3 psi above atmospheric pressure. The invention also relates to an aqueous phenol formaldehyde resole for preparing the improved phenolic resole foamable composition and phenolic foams.

2. Prior Art

Phenolic foams prepared from phenolic resoles have been known for years. It is generally agreed that phenolic foams have the best fire rating of any known foam insulation. Phenolic foam does not burn even when contacted by the flame of a blow torch and gives off minimal amounts of toxic gases. Phenolic foams can stand temperatures of 375° F. without serious degradation. Phenolic foams have an ASTM E-84 Steiner Tunnel Flame Spread Rating around 5, a Fuel Contribution of about 0 and a Smoke Rating of about 5.

Despite these advantages and generally favorable economics, phenolic foams have not penetrated the thermal insulation market. The reason phenolic foams have not been successful is that phenolic foams made heretofore have exhibited either an unsatisfactory initial thermal conductivity or an undesirable increase in thermal conductivity over time. Additionally, the compressive strength of prior art phenolic foams is not as high as desirable for normal handling. It has also been reported that prior art phenolic foams have serious problems with friability and punking.

The general composition and method for preparing phenolic foam are well known. Generally, a foamable phenolic resole composition is prepared by admixing aqueous phenolic resole, blowing agent, surfactant, optional additives and an acid curing agent into a substantially uniform composition. The curing catalyst is added in amounts sufficient to initiate the curing reaction which is highly exothermic. The exotherm of the curing reaction vaporizes and expands the blowing agent thereby foaming the composition. The foaming process is preferably performed in a substantially closed mold.

The general method for the continuous manufacture of phenolic foam insulation board is as follows. The foamable phenolic resole composition is prepared by continuously feeding into a suitable mixing device the aqueous phenolic resole, blowing agent, surfactant, optional additives, and acid curing catalyst. The ratio of these ingredients is varied depending on the density, thickness, etc. desired in the final product. The mixing device combines these ingredients into a substantially uniform composition which is continuously applied evenly onto a moving substrate, usually a protective covering such as cardboard, which adheres to the foam. The foaming composition is usually covered with another protective covering such as cardboard which becomes adhered to the phenolic foam. The covered foaming composition is then passed into a double belt press type apparatus where the curing exotherm continues to vaporize and expand the blowing agent, thereby foaming the composition as it is cured.

As mentioned, one of the main drawbacks of prior art phenolic foam is an unsatisfactory initial thermal conductivity (k value). It is believed that one of the main causes of phenolic foam having a poor initial thermal conductivity is due to the rupturing of the cell walls during the foaming and early curing of the foamable phenolic resole composition. This rupturing causes an immediate loss of fluorocarbon blowing agent which results in a poor initial thermal conductivity. Ruptured cell walls also provide ready passage of water into the foam, causing a further increase in thermal conductivity. It is also believed that ruptured cell walls deleteriously affect the compressive strength and other properties of the phenolic foams. Another main cause of initial poor thermal conductivity in phenolic foams is the loss of fluorocarbon blowing agent before the cell walls of the foaming compositions are sufficiently formed to entrap the blowing agent.

Also as mentioned, another drawback of prior art phenolic foams is the undesirable increase of thermal conductivity over time (k factor drift). Even in the prior art foams which have cell walls which are not ruptured and which have the fluorocarbon entrapped in the cells, the phenolic foams have a tendency to lose the fluorocarbon blowing agent over time with a corresponding increase in thermal conductivity. It is believed that there are two main causes of the increase in thermal conductivity over time. The first and main cause is the presence of small perforations or pinholes in the cell walls. These small perforations allow the fluorocarbon blowing agent to diffuse out over time and be replaced by air. This slow replacement by air causes an increase in thermal conductivity and loss of thermal insulation value. The small perforations also allow the phenolic foam to absorb water, thereby further increasing the thermal conductivity.

The other main cause of the loss of thermal conductivity over time is cracking of the cell walls. In many prior art phenolic foams the cell walls are very thin. When phenolic foams having thin cell walls are subjected to high temperatures, the cell walls dry out and crack. Also, since thermal insulation is normally subject to heating and cooling cycles with concomitant expansion and contractions, the cracking of the thin cell walls is aggravated. Cracking of the cell walls allows the fluorocarbon blowing agent to leak out over time with an and increase in thermal conductivity and loss of thermal insulation values.

The art has proposed several methods for overcoming the problem of poor thermal conductivity. For example, one method involves a two-step process comprising foaming the foamable phenolic resole composition initially under a vacuum followed by curing at high temperatures and low pressures. This method does produce a foam having a substantial number of cell walls which are not ruptured; however, there are still many cell walls which are either ruptured or which contain perforations or which are thin and readily crack when subjected to thermal stress. This method is also not commercially desirable because of the equipment that is necessary and the extended time that is required. Another method involves foaming and curing the foamable phenolic resole at low temperatures (i.e., less than 150° F.). This method also reduces the number of cell walls that are ruptured but the resulting phenolic foam still has thin cell walls and perforations. Another method covered by a copending application assigned to the same assignee covers a method of foaming and curing the foamable phenolic resin composition while maintaining pressure on the foaming and curing composition. This method greatly reduces the number of ruptured cell walls but the resultant phenolic foam may still have a substantial number of ruptured cell walls or may have lost the blowing agent before the cell walls were cured and the cell walls may be thin and have perforations.

Other attempts at improving the thermal conductivity of phenolic foams have been based on developing specially modified phenolic resoles, or surfactants, or the use of certain additives in the foamable phenolic resole composition. None of these methods has been commercially successful. See, for example, U.S. Pat. Nos. D'Allesandro 3,389,094; Bunclark et al. 3,821,337; Moss et al. 3,968,300; Moss 3,876,620; Papa 4,033,910; Beal et al. 4,133,931; Bruning et al. 3,885,010; and Gusmer 4,303,758. Accordingly, it is the object of the present invention to provide an improved closed cell phenolic foam having cell walls without ruptures or perforations.

Another object of this invention is to provide an improved closed cell phenolic foam having low initial conductivity with little, if any, increase in the thermal conductivity over time without adversely affecting the friability, compressive strength or flammability characteristics of the phenolic foam.

A still further object of the present invention is to provide a composition and method for making the improved phenolic foams.

Additional objects and advantages of the present invention will be apparent to those skilled in the art by reference to the following description and drawings.

SUMMARY OF THE INVENTION

The present invention comprises a closed cell phenolic foam having a uniform cell structure with cell walls substantially free of both ruptures and perforations. The phenolic foam has an initial k value of less than 0.15 and preferably from 0.10 to 0.13 and which does not increase substantially with time. The phenolic foam also has compressive strengths of from 20 to 35 psi and a density of from 1.5 to 5.0 pounds per cubic foot. In addition to these characteristics, the phenolic foam also has an excellent fire rating.

The improved phenolic foam is a direct result of the method and composition used to prepare the foam. The improved method comprises introducing into a substantially closed volume a phenolic resole foamable composition comprising an aqueous phenolic resole, a surfactant, a blowing agent, an acid catalyst and optional ingredients and allowing this composition to foam and cure in this volume while maintaining a pressure in excess of about 3 pounds per square inch above atmospheric pressure on the volume during foaming and curing.

A critical feature of the present invention is the use of certain anhydrous aryl sulfonic acids as the acid curing catalyst. The anhydrous aryl sulfonic acid catalysts that are useful in the invention are those aryl sulfonic acids which have a pKa of less than about 2.0, which have a high degree of compatibility with the phenolic resole and which lower the compatibility of the resole with water sufficiently enough to prevent both perforations and ruptures in the cell walls of the foam. Some of the useful anhydrous aryl sulfonic acid catalysts may be represented in the following formula:

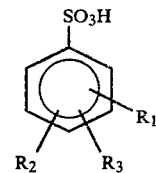

where $R_1$, $R_2$, and $R_3$ are independently selected from H, lower alkyl groups of 1-6 carbon atoms, $NH_2$, $SO_3H$, halogen, and non polar groups and where the sum of the carbons in $R_1$, $R_2$ and $R_3$ is less than 12. Some other useful anhydrous aryl sulfonic acids are the naphthalene sulfonic and substituted naphthalene sulfonic acids. The preferred catalysts are where $R_1$, $R_2$ and $R_3$ are selected from H and lower alkyl groups of 1-3 carbon atoms. It is also within the scope of this invention to use mixtures of anhydrous aryl sulfonic acids and, in fact, the most preferred catalyst is a combination of toluene sulfonic acid and xylene sulfonic acid. It should be noted that all acids of the present invention are not covered by the above formula nor are all acids covered by the above formula part of the invention. The criteria for determining whether an acid is part of the invention are whether the acid is a strong acid has a pKa of less than about 2.0 and changes the compatibility of the phenolic resole with water sufficiently enough to prevent perforations in the cell walls.

Another critical feature of the present invention is the use of an improved aqueous phenolic resole for preparing the foamable phenolic resole composition and phenolic foam. The aqueous phenol formaldehyde resole is essentially a phenol formaldehyde condensation polymer having a molar ratio of formaldehyde to phenol of from about 1.7:1 to about 2.3:1, preferably from about 1.75:1 to about 2.25:1 and most preferably about 2:1. The phenolic resole has a weight average molecular weight as determined by gel permeation chromatography (GPC) of at least 800 and preferably from about 950-1500. The resole also has a number average molecular weight as determined by GPC of at least 350 and preferably from about 400 to about 600 and a dispersivity greater that 1.7, preferably from about 1.8 to 2.6. Phenol formaldehyde resoles having these properties can be processed in accordance with this invention on a consistent and repeatable basis into closed-cell phenolic foams having initial k values of 0.10 to 0.13, compressive strengths of 20 to 35 psi and densities of from 1.5 to 5.0 pounds per cubic foot. The foam also has excellent fire ratings.

The improved aqueous phenol formaldehyde resole can be produced using any of the standard procedures known for making aqueous phenolic resoles. The preferred method for preparing the aqueous phenolic resoles comprises reacting highly concentrated aqueous phenol (>88% by weight) with highly concentrated formaldehyde (>85% by weight) in the presence of an alkaline catalyst in a concentration slightly higher than those normally employed in preparing phenolic resoles. In the preferred method, the formaldehyde is added serially or continuously during the first part of the condensation reaction to a mixture of phenol and the alkaline catalyst.

BRIEF DESCRIPTION OF THE DRAWINGS

Like numerals refer to like parts in the following drawings.

FIG. 2 illustrates diagrammatically a side view of cross-sections of a double belt type apparatus for continuously making phenolic foam.

FIG. 3 illustrates diagrammatically a partial sectional view taken along line III—III of FIG. 2.

DETAILED DESCRIPTION OF THE INVENTION

Figure 1A:
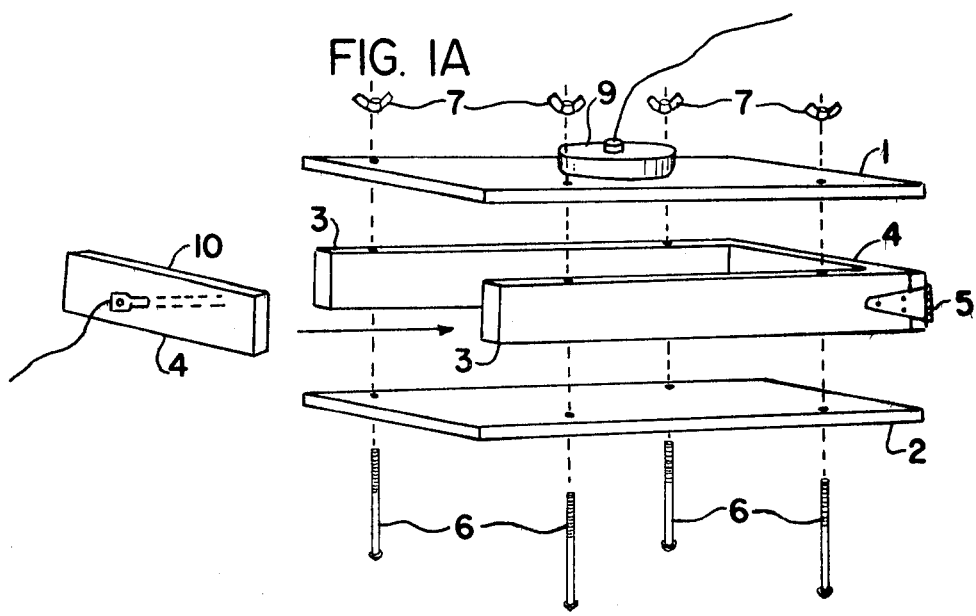
FIGS. 1A and 1B illustrate diagrammatically in partial cross-section substantially closed molds used in making phenolic foam in the laboratory.

As mentioned above, the use of phenolic foams for thermal insulation applications, particularly for roofs, walls and pipes, is highly desirable because of the excellent fire properties that are inherent in phenolic foams. However, phenolic foams heretofore known suffer from generally unacceptable initial k factors or their inability to retain a low k factor over time. The thermal insulating ability of a foamed material generally may be evaluated by the thermal conductivity or k factor. The thermal conductivity or k factor of a particular insulation material is measured according to ASTM Method C-518 Revised and is typically expressed dimensionally as BTU per inch per hour per square foot per °F. The lower the k factor, the better is the insulating quality of the material. Additionally, the longer the foam can retain a low k factor, the better is the insulating efficiency of the material.

A low k factor is understood to mean a k factor substantially below about 0.22, which is approximately the k factor of air. An initially low k factor is understood to mean a k factor of substantially below 0.22 when measured after the foam that is initially produced comes to an equilibrium water content, generally within about five days. It has been found that the phenolic foam of the present invention will have k factors that decrease during the first several days as the water content of the phenolic foam comes to equilibrium with the environment. Thereafter, the k factor remains substantially constant over time. Phenolic foams of the present invention have initial k factors measured according to the ASTM method of less than 0.15 and generally in the range of 0.10 to 0.13. Some of the foams prepared with the preferred embodiment of the present inventions have had k factors less than 0.10 when measured at very low water content. This low k factor was retained over time and there was little or no increase of k factor.

Phenolic foams prepared from the aqueous phenolic resoles of the invention generally have overall densities (i.e., including foam skin) ranging from about 1.5 to about 5.0 pounds per cubic foot (about 24 to about 80 kg/cu. meter) and preferably ranging from about 2.0 to about 4.0 pounds per cubic foot (about 32 to about 64 kg/cu. meter) and core densities (i.e., without foam skin) ranging from about 1.5 to about 4.5 pounds per cubic foot (about 24 to about 72 kg/cu. meter) and preferably ranging from about 2.0 to about 3.5 pounds per cubic foot (about 32 to about 56 kg/cu. meter). The phenolic foams are substantially closed-cell foams (i.e., substantially free of ruptured cells) generally containing at least 90 to 95 percent closed cells and typically greater than 95 percent closed cells as measured, for example, by an air pycnometer according to test ASTM D-2865-70 (1976).

The k factor of a phenolic foam is directly related to the ability of the foamable phenolic resole composition to entrap the blowing agent during the foaming and curing steps and to retain the blowing agent over time. The thermal conductivity of a phenolic foam is directly related to the thermal conductivity of the entrapped gas. A phenolic foam that has only air entrapped would be expected to have a k factor of approximately 0.22. A phenolic foam that has a fluorocarbon entrapped would be expected to have a k factor approaching the thermal conductivity of the entrapped fluorocarbon. Commercial fluorocarbons have k factors around 0.10. Accordingly, an excellent phenolic foam will have a k factor around 0.10 and will retain this k factor over time. The phenolic foams of this invention have such k factors and retain these k factors over time.

As mentioned herein, it is believed that the generally poor k factor of prior art phenolic foam is attributable to two main causes. One cause is the loss of the blowing agent before the cell walls are formed sufficiently strong to entrap the blowing agent. The other cause is the rupturing of the cell walls during foaming. Also as mentioned herein, the loss of thermal insulation value over time is believed to be caused by the many small perforations found in the cell walls and by the cracking of the thin cell walls by thermal stress.

The main cause of the cell walls rupturing is the pressure exerted by the expanding blowing agent during the formation of the phenolic foam. At the temperatures normally used for commercially preparing phenolic foams (i.e., 125° F.–250° F.), the pressure exerted by the blowing agent during foaming and curing is greater than that which can be withstood by the cell walls, especially during the early part of the foaming and curing. The cell walls of phenolic foams prepared with resoles of the prior art cannot withstand very much pressure until the foaming is complete and substantial curing occurs. In addition, the phenolic resoles of the prior art have an exotherm that is too high (>200° F.) and too quick, thus reaching high peak pressures before the cell walls are strong enough to withstand the pressures. Accordingly, the expanding blowing agent ruptures the cells before they are sufficiently cured, resulting in a foam with unacceptable thermal conductivity characteristics. A method for inhibiting the rupturing of cell walls during foaming and curing is disclosed in a copending application. This method comprises maintaining a pressure against the surfaces of the foamable phenolic resole compositions during foaming and curing.

Another cause of the rupturing of the cell walls is the presence of water in the foamable phenolic resole composition, particularly water present in the catalyst system. The rupturing of cell walls caused by water in the foamable phenolic resole composition, particularly the catalyst, is not as severe as rupturing caused by not having a restraining force on the foaming composition of at least about the same magnitude as the pressure exerted by the foaming composition, nor is it as severe as rupturing caused by using a resole that has an exotherm that is too high and too quick. Nevertheless, rupturing caused by water is severe enough to deleteriously affect the k factor of the phenolic foam. The use of the anhydrous aryl sulfonic acid catalyst of this invention prevents rupturing of the cell walls caused by water. While these methods help prevent the rupturing of the cell walls, they will not prevent the rupturing of substantially all the cell walls unless the special phenolic resoles of the present invention are also used.

The loss of blowing agent before the cell walls are formed sufficiently strong to entrap the expanding blowing agent is caused by two interrelated factors. First, the resoles of the prior art are highly reactive. When quantities of the acid curing agent sufficient to foam and cure the resole in acceptable times are added to these resoles, they exotherm very rapidly and reach peak exotherms substantially greater than 200° F. This rapid and high exotherm blows off most of the blowing agent before the cell walls are sufficiently formed to maintain the blowing agent. The result is a phenolic foam with only a small amount of blowing agent entrapped in the cells. Additionally, a rapid and high exotherm also tends to rupture the cell walls even in the presence of a constraining force. Secondly, the resoles of the prior art have low viscosity characteristics, especially when formulated into foamable compositions with surfactants, blowing agents and acid catalysts. As the temperature of the foamable composition increases during the early foaming, the viscosity of the resin is greatly reduced and does not increase until substantial crosslinking of the resole takes place. Cell walls formed from the low viscosity resin are not able to entrap and retain the blowing agent until substantial curing takes place. Accordingly, much of the blowing agent is lost before the cell walls are strong enough, resulting in a phenolic foam with little or no entrapped blowing agent.

The formation of cell walls which are very thin and crack when subject to thermal stress is also caused by resoles having too quick and high of an exotherm and too low of a viscosity. As mentioned above, as the temperature of the foamable composition increases during the early foaming and curing reactions, the viscosity of the phenolic resin decreases or at least does not increase appreciably until substantial crosslinking takes place. During this time until the viscosity of the phenolic resin appreciably increases, the phenolic resin forming the cell walls has a tendency to drain. Drainage is accompanied by a progressive thinning of the cell walls and thickening of the struts. If too much drainage occurs before the cell walls are sufficiently set, the resulting cell walls are very thin. In addition, thin cell walls are easily ruptured by the blowing agent and crack readily when subjected to high temperatures, drying, or normal expansion and contraction.

The formation of cell walls containing perforations is believed to be caused by the water present in the foamable phenolic resole composition and is particularly aggravated by water in the acid curing catalyst. The aqueous phenolic resole has a certain compatibility for water. During the foaming and curing steps, the aqueous phenolic resole is being crosslinked and goes from a water compatible resole to a somewhat water incompatible foam. As the aqueous phenolic resole goes from water compatibility to a state of substantially reduced water compatibility during the foaming and curing, it expels water. This expulsion of water from the aqueous phenolic resole as it is crosslinked during foaming and curing causes perforations in the cell walls. In particular, it has been found that the presence of water in the catalyst system is especially deleterious and adds significantly to the number of perforations found in the cell walls. It has also been found, in accordance with this invention, that the presence of water in the catalyst causes rupturing of some cell walls, but the primary cause of rupturing is the lack of restraining pressure in the mold and the use of highly exothermic phenolic resoles.

The composition and method of the present invention provide a closed-cell phenolic foam which entraps the blowing agent, is substantially free of ruptured cell walls, has thick and strong cell walls, and is free of perforations in the cell walls. Accordingly, the phenolic foam of the present invention has a good initial k factor which does not increase substantially with time. The phenolic foam also has good compressive strengths, density, friability and other properties desirable in a phenolic foam insulation product. The composition and method of the present invention also make it possible to produce phenolic foam having these properties on a consistent and repeatable basis.

In accordance with the present invention, the rupturing of the cell walls is greatly alleviated during foaming and curing by conducting the foaming and curing under conditions such that a pressure of greater than about 3 psi above atmospheric pressure is maintained against the surfaces of the foam during foaming and curing. This is accomplished by foaming and curing in a substantially closed mold capable of withstanding pressures in excess of about 3 psi above atmospheric pressure. The importance of using a substantially closed mold capable of exerting a pressure greater than about 3 psi above atmospheric pressure can be appreciated by comparing FIGS. 34 and 35 with FIG. 9.

Figure 34:
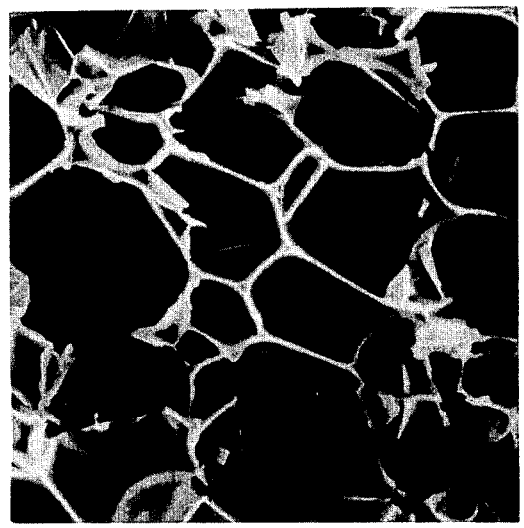
Figure 35:
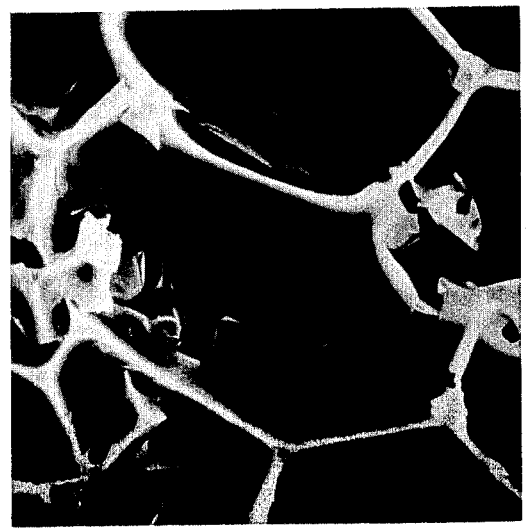

The phenolic foam of FIGS. 34 and 35 are prepared using the preferred phenolic resoles and catalyst of the present invention but without the application of pressure. It can readily be seen from FIGS. 34 and 35 that the phenolic foam has most of the cell walls ruptured. The cell walls have been blown out by the expansion of the blowing agent. Because most of the cell walls have been ruptured, the phenolic foam did not entrap the fluorocarbon blowing agent and, accordingly, has a poor k value. The k value for the phenolic foam of FIGS. 34 and 35 was 0.22.

Figure 9:
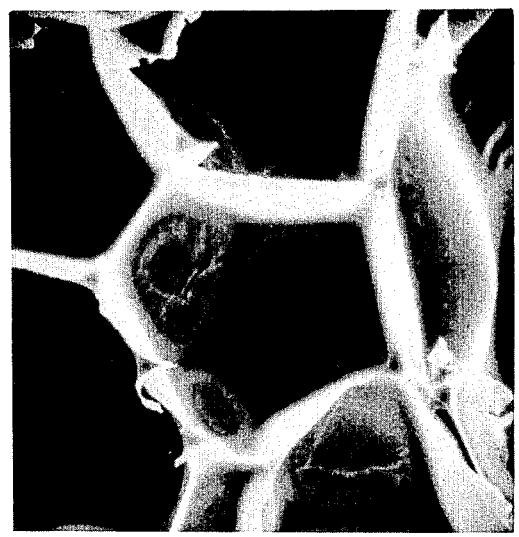

In comparison, the phenolic foam of FIG. 9 was prepared using a substantially closed mold that was designed to withstand a pressure of about 15 psi above atmospheric pressure. The only difference between the phenolic foam of FIGS. 34 and 35 and that of FIG. 9 is the use of a closed mold. As can be seen, the cells of the phenolic foam of FIG. 9 have not been ruptured by the blowing agent. The phenolic foam of FIG. 9 had an initial k value of 0.14 and k values after 30 days of 0.117 and after 150 days of 0.117. From the above it is evident that it is necessary to have a positive constraining pressure during the foaming and curing process in order to prevent the cell walls from being ruptured by the blowing agent. The amount of restraining pressure that is necessary will depend on the amount of pressure generated by the foaming composition and the ability of the cell walls to retain in the blowing agent without a restraining pressure. The amount of pressure generated will vary depending on such factors as the amount and type of blowing agent, the amount of acid catalyst, the amount of resole and the amount and type of optional additives. Generally the pressure generated using the catalyst and resole of this invention will be between 3 to 10 psi above atmospheric. The cell walls of the foaming composition of this invention will not withstand these pressures without rupturing. Accordingly, a restraining pressure is maintained on the foaming composition. In order to be safe it is advisable for the molds used in making the foam of the present invention to be designed to withstand pressures in excess of 15 psig.

Although the use of pressure may prevent the cells from rupturing, the phenolic foams prepared using pressure alone will generally have a k factor that may be initially acceptable but which deteriorates over time. By looking at the phenolic foams of FIGS. 25, 26 or 30 it can be seen that even in those cells which are not ruptured there are a multitude of small perforations or cracks in the cell walls. These perforations and cracks allow the fluorocarbon blowing agent to diffuse out of the phenolic foam over time and be replaced by air and/or water, thus causing an increase in the k factor.

In accordance with the present invention, it has been found that the perforations in the cell walls can be significantly reduced and, in fact, substantially eliminated by using certain anhydrous aryl sulfonic acids as the foaming and curing catalysts. The term cell walls as used herein include the struts which are formed where the cell walls are joined together and the present invention also eliminates the perforations in the struts. The amount of anhydrous aryl sulfonic acid used is generally more than the amount necessary to merely catalyze the phenolic foam reaction.

Although not intending to be bound by any theories, it is believed that the anhydrous aryl sulfonic acids of the present invention work in the following manner. The anhydrous aryl sulfonic acids useful in the present invention are strong organic acids which very readily catalyze the reaction of the phenolic resole to a thermoset polymer. In the phenolic resole foamable compositions, the anhydrous aryl sulfonic acids have a low water compatibility and very high resin compatibility. When the anhydrous aryl sulfonic acids are thoroughly mixed with the aqueous phenolic resole during the preparation of the foamable phenolic resole composition, they rapidly change the water compatibility of the resole and immediately begin to expel water from the resole before substantial foaming and curing occur so that the resulting foam is substantially free from perforations in the cell walls. Since the anhydrous aryl sulfonic acid is the foaming and curing catalyst, the water is expelled from the phenolic resole as the foaming and curing reactions are initiated. It is believed that the anhydrous aryl sulfonic acid causes water to be expelled from the aqueous resole at a time and rate that is earlier and quicker than the liberation of water caused by the crosslinking of the aqueous resole during the foaming and curing reaction. The anhydrous aryl sulfonic acid does not expel all of the water from the aqueous phenolic resole but it is believed that it expels sufficient water and at a sufficient rate so that the amount of water remaining in the aqueous phenolic resole is not liberated by the crosslinking reaction in amounts to cause ruptures or perforations during foaming and curing.

It is also necessary that the aryl sulfonic acids are substantially anhydrous, i.e., less than about 3.0 percent by weight free water and preferably less than 0.5 percent by weight free water. If the aryl sulfonic acids contain free water, they are not efficient enough in expelling the water from the aqueous phenolic resole and will not expel the water in the catalyst itself. Accordingly, there will be too much water present during the foaming and curing and the result will be a phenolic foam containing ruptures or perforations in the cell walls. The term free water means water that is not bound to the catalyst molecules. For example, toluene sulfonic acid is available as the monohydrate. Toluene sulfonic acid monohydrate will reduce the perforations in the cell walls of the phenolic foam. However, if additional water is present the hydrated aryl sulfonic acids will not work. Additionally, the hydrated aryl sulfonic acids are not preferred since they are not as effective as the anhydrous aryl sulfonic acids and the monohydrated aryl sulfonic acids are generally crystalline and more difficult to uniformly mix into the foamable phenolic resole composition.

All anhydrous aryl sulfonic acid catalysts will not overcome the problem of both perforations and ruptures in the cell walls caused by water. Only anhydrous aryl sulfonic acids having a strong acidity (i.e., a pKa value of less than about 2.0) combined with a phase relationship with water and the phenolic resole such that the anhydrous aryl sulfonic acid reduces the compatibility of the phenolic resole with water enough to expel sufficient water from the aqueous resole to prevent perforations and ruptures in the cell walls are useful in the present invention. When anhydrous aryl sulfonic acids having this combination of properties are thoroughly mixed with the aqueous phenolic resin, they immediately expel water from the phenolic resin before substantial foaming and curing occur so that the resulting foam is substantially free of perforations and ruptures caused by water in the cell walls. The expelled water ends up in the cells of the foam and since the cured foam exhibits a certain water compatibility, the expelled water diffuses out of the foam as the foam is dried to equilibrium conditions. Since the anhydrous aryl sulfonic acid is the foaming and curing catalyst, the water is expelled from the aqueous phenolic resole at a very early stage in the foaming and curing reactions and is not present in the resole in sufficient quantities to cause perforations. The anhydrous aryl sulfonic acid catalyst does not expel all of the water from the aqueous phenolic resole but expels sufficient water so that perforations and ruptures caused by water in the cell walls do not occur.

Even though the generic class of aryl sulfonic acids are well known foaming and curing catalysts for phenolic foams, all of these aryl sulfonic acids, even in the anhydrous state, will not work. Only those anhydrous aryl sulfonic acids which have a high acidity combined with the required resole/water/anhydrous acid phase relationship are effective. For example, phenol sulfonic acid is a well known aryl sulfonic acid that has been used for years to foam and cure phenolic foam. However, even completely anhydrous phenol sulfonic acid will not work in the present invention since it does not have the required compatibility properties. It is believed that the polar hydroxyl group gives the phenol sulfonic acid a water compatibility that is too high. The resulting resole/water/phenol sulfonic acid phase relationship is such that water is not expelled at a sufficient rate and/or in sufficient quantities from the aqueous resole by the phenol sulfonic acid, resulting in a foam with perforations and ruptures in the cell walls. Similarly, alkyl sulfonic acids are strong acids that have been used for years to cure phenolic resoles. However, the anhydrous alkyl sulfonic acids do not have the capability of sufficiently altering the compatibility of the resole with water.

Some of the useful anhydrous aryl sulfonic acid catalysts that have the required acidity in combination with the capability of altering the resole/water compatibility relationship may be represented by the following formula:

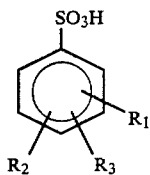

where $R_1$, $R_2$, and $R_3$ are independently selected from H, lower alkyl groups of 1-6 carbon atoms, $NH_2$, $SO_3H$, halogen and non polar groups and where the sum of the carbons in $R_1$, $R_2$ and $R_3$ is less than 12. Some other useful anhydrous aryl sulfonic acids are the naphthalene sulfonic acid and the substituted naphthalene sulfonic acids. The preferred catalysts are where $R_1$, $R_2$ and $R_3$ are independently selected from hydrogen and lower alkyl groups of 1-3 carbon atoms. The most preferred catalysts are toluene sulfonic acid and xylene sulfonic acid, especially a conbination of these two acids. It should be noted that all acids of the present invention are not covered by the above formula nor are all acids covered by the above formula part of the invention. The criteria for determining whether an acid is part of the invention are whether the acid has a pKa less than about 2.0 and changes the compatibility of the aqueous phenolic resole with water sufficiently enough to prevent perforations and ruptures in the cell walls.

It is also within the scope of this invention to add limited amounts of other acids, particularly in the anhydrous form, to the anhydrous aryl sulfonic acids provided such additional acids do not prevent the anhydrous aryl sulfonic acid from changing the compatibility of the aqueous resole with water sufficiently enough to prevent both perforations and ruptures in the cell walls. Examples of such acids that may be tolerated in limited amounts include phophoric, sulfuric, methane sulfonic and ethane sulfonic. For example, limited amounts of phosphoric acid or boric acid may be useful in improving the fire retardant and non-punking properties of the phenolic foam. In addition, small amounts of sulfuric acid may be added to increase the rate of foaming and curing.

The applicability of any particular anhydrous aryl sulfonic acid in the present invention for reducing or eliminating both perforations and ruptures caused by water in the cell walls of phenolic foams can easily and readily be determined. First, a composition is prepared using an aqueous phenolic resole, surfactant and blowing agent in accordance with the preferred procedures described herein. Then 84 parts of the composition is foamed and cured using 16 parts of the anhydrous aryl sulfonic acid to be evaluated. The cell walls of the resulting foam are examined with a scanning electron microscope. If the cell walls are substantially free of ruptures and perforations caused by water, the catalyst is useful in the present invention; however, if the cell walls contain perforations, the catalyst is not of the present invention. In preparing the test foam it is possible to add optional additives. The ratio of the various ingredients may be varied but it is desirable to keep them within the preferred ranges set forth herein.

Figure 25:
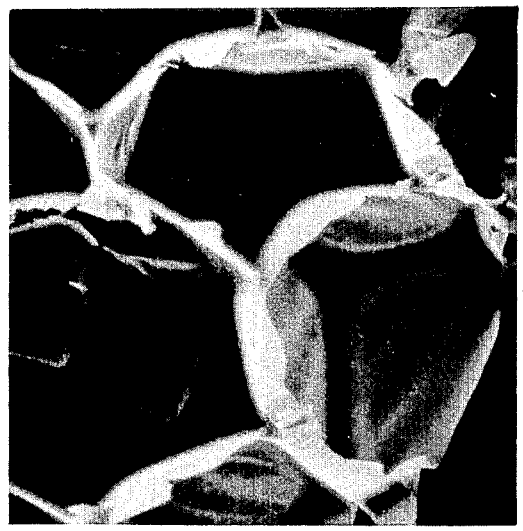
Figure 26:
Figure 27:
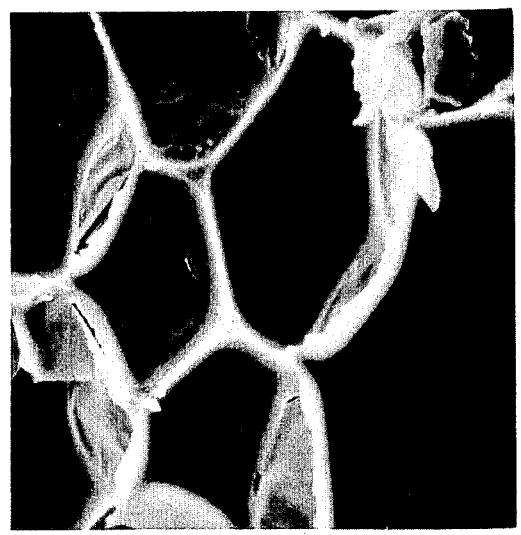
Figure 28:
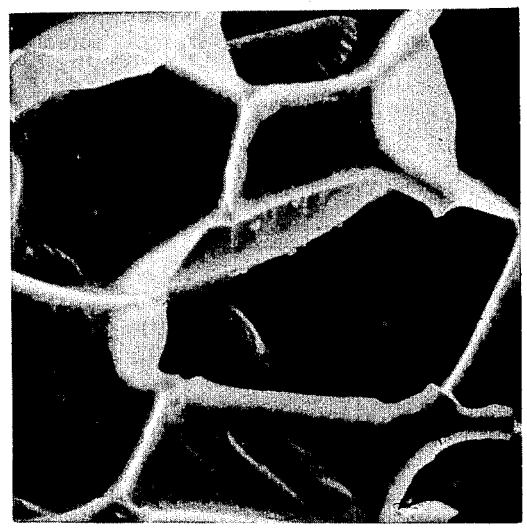

The importance of using an anhydrous aryl sulfonic acid catalyst can be appreciated by comparing the phenolic foams of FIGS. 25, 26, 27 and 28. The phenolic foams of FIGS. 25, 26, 27 and 28 were prepared using the preferred phenolic resole and conducting the reaction under the heretofore discussed pressure limitations; however, the catalyst contained 10 percent, 5 percent, and 2 percent by weight water, respectively. FIGS. 25, 26 and 27 clearly show that the resulting phenolic foam contains many perforations and some ruptures in the cell walls. These cell walls allow the fluorocarbon blowing agent to leak out over time and be replaced with air. They also allow the absorption of water by the foam. This causes an increase in the conductivity k value over time with a resulting loss of thermal insulation efficiency. In comparison, the phenolic foam of FIG. 26 was made using an anhydrous aryl sulfonic catalyst of the present invention. The phenolic foam of FIG. 28 is substantially free of both ruptures and perforations. The foam of FIG. 28 had an initial k factor of 0.120 while the foams of FIGS. 25, 26 and 28 had initial k factors of 0.22.

Figure 11:
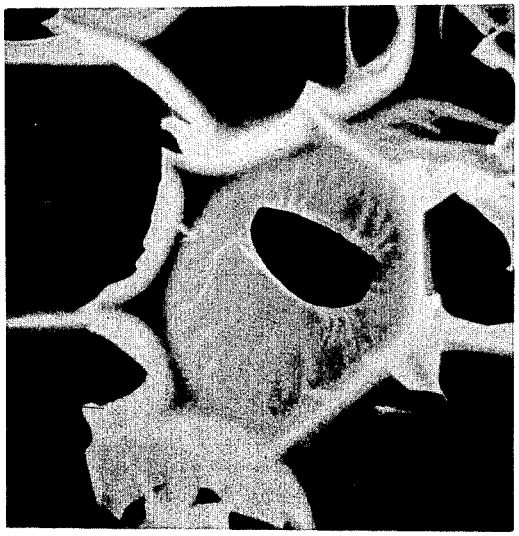

The foam of FIG. 11 is substantially free of perforations but has many cell walls that are ruptured. The foam of FIG. 11 was made using a phenolic resole that has an exotherm that is too high and too quick. A comparison of the foam of FIG. 11 and FIG. 9 illustrates the importance of the special phenolic resole of the present invention.

Another important aspect of the present invention is the use of a special aqueous phenolic resole. In order to prepare a phenolic foam that is free of ruptured cell walls and that has the fluorocarbon blowing agent entrapped, it is necessary to use the phenolic resole of the present invention. In general, the anhydrous aryl sulfonic acids will be used in amounts ranging from about 6 percent to 20 percent by weight of the overall phenolic resole foamable composition. Aryl sulfonic acids are extremely good catalysts for this reaction and can be used to foam and cure aqueous phenolic resoles in quantities less than those required by the present invention. When used in the quantities required by the present invention with conventional commercially available aqueous phenolic resoles, the foaming reaction exotherms too high and too quickly and the foam viscosity of the foamable phenolic resole composition is too low, causing the fluorocarbon blowing agent to be expelled to the atmosphere before the cells are sufficiently formed to entrap the fluorocarbon blowing agent and also causing the rupturing of a substantial number of cell walls. Accordingly, it is desirable to have an aqueous phenolic resole that can be catalyzed with large quantities of anhydrous aryl sulfonic acid without reacting too high and too quick and boiling off the fluorocarbon blowing agent or rupturing the cell walls. The aqueous phenolic resole of the present invention is such a resole.

The aqueous phenolic resole of the present invention is an improved resole compared to the prior art aqueous phenolic resoles. It is well known in the art to base catalyze the condensation of phenol and formaldehyde in aqueous solution to produce liquid condensates commonly called resoles. As discussed herein and as is well known, the aqueous phenolic resoles are readily cured to higher molecular weight, crosslinked thermoset resins. The curing reaction is highly exothermic and is greatly accelerated by acidic materials. The aqueous resoles of the prior art can be combined with blowing agents, surfactants, and curing agent and optional additives into a foamable composition which can be foamed and cured into phenolic foam. However, the resoles of the prior art generally suffer from two drawbacks; namely, they have an exotherm that is too high and too fast and they have too low a viscosity. First, the prior art resoles, when used with the quantities of acid catalyst necessary to foam and cure the composition in an acceptable time, have an exotherm that is too high and too quick. This causes either the cell walls of the resulting foam to be ruptured or the blowing agent to be blown off before the cell walls are sufficiently strong to entrap the blowing agent. In either case, the result is a phenolic foam having an initial poor k factor. Second, the viscosity of the prior art resoles is too low, especially when formulated into foamable compositions. The low viscosity allows the blowing agent to escape before the cell walls are strong enough to entrap the blowing agent and allows the phenolic resole to drain from the cell walls into the struts as they are being foamed, resulting in a very thin cell wall that cracks during normal use. This also leads to a phenolic foam with unacceptable thermal insulation properties.

In comparison, the aqueous phenolic resole of the present invention does not have the drawbacks mentioned above. When formulated into foamable compositions and cured with the quantities of the anhydrous aryl sulfonic acid necessary to foam and cure the composition in an acceptable commercial time, the resoles do not exotherm too high or too fast. The preferred foamable phenolic resole compositions of the present invention generally reach a maximum pressure in about 2-3 minutes after the anhydrous aryl sulfonic acid is added. During this period, the foaming compositions reach a temperature of from about 165°-175° F. The temperature during this period never exceeds 190° F. The maximum pressure generated during this period is usually between 4 and 6 psi above atmospheric and generally never exceeds 10 psi above atmospheric. Accordingly, phenolic foams that have entrapped substantially all of the blowing agent and that have cell walls which are not ruptured can be manufactured. Additionally, the viscosity of the foamable resole compositions are high enough to entrap the blowing agent during the early stages and do not drain appreciably so that stronger and thicker cell walls are foamed.

The improved aqueous phenolic resole of the present invention is essentially a phenol formaldehyde condensation polymer having a molar ratio of formaldehyde to phenol of from about 1.7:1 to about 2.3:1, preferably from about 1.75:1 to about 2.25:1 and most preferably about 2:1. The phenolic resole has a weight average molecular weight of at least about 800 and preferably from about 950 to 1500. The phenolic resole also has a number average molecular weight of at least about 350 and preferably from about 400 to about 600, and a dispersivity greater than 1.7, preferably from about 1.8 to 2.6. The aqueous phenolic resole of the present invention may be a mixture of more than one resole as long as the resulting resole has the required characteristics.

The improved aqueous phenol formaldehyde resoles of the present invention are prepared by reacting phenol and formaldehyde in the desired molar ratios in the presence of a basic catalyst until the resulting phenolic resoles has the required molecular weight and dispersivity characteristics. The reaction may be accomplished using any of the well known prior art methods. For example, the phenol, formaldehyde and catalyst can be charged to a reactor in the desired molar ratios and reacted until the desired molecular weights are achieved. Alternatively, one or two of the ingredients can be charged to the reactor and the remaining ingredients added to the reaction mixture over time. In the preferred method of preparing the aqueous phenolic resole, the phenol and basic catalyst are added to the reactor and the formaldehyde is metered in serially or continuously during the early part of the condensation reaction. The method for preparing the phenolic resin is not critical as long as the phenol and formaldehyde are condensed in the desired molar ratios and have the required molecular weight and dispersivity. characteristics.

As mentioned before, the phenolic resole must have a molar ratio of formaldehyde to phenol of from about 1.7:1 to 2.3:1. If the ratio is higher than 2.3:1, then the resulting phenolic foam may have a residual free formaldehyde content that may create an odor problem. In addition, molar ratios exceeding 2.3:1 yield phenolic resoles that have too slow an exotherm and too high of a processing viscosity. Phenolic foams prepared from resoles having a molar ratio greater than 2.3:1 also tend to be too friable and have poor compressive strength. If the molar ratio is less than 1.7:1, then the resole has too low of a viscosity, resulting in thin cell walls. Phenolic resoles having molar ratios less than 1.7:1 also are too highly exothermic, making it difficult to entrap the blowing agent and keep the cell walls from rupturing. Phenolic foams made from these resins also have too much shrinkage.

The phenolic resole must have a weight average molecular weight greater than 800, preferably between 950 and 1500. If the weight average molecular weight is less than 800, the phenolic resin is too reactive and not viscous enough. Phenolic resoles having weight average molecular weights less than 800 have a peak pressure and exotherm temperature which are both too quick and too high. These resoles also reach an exotherm temperature greater than 200° F. during this period. This rapid and high exotherm causes many of the cell walls to be ruptured and the fluorocarbon blowing agent to be lost before the cells are formed. In addition, phenolic resins with weight average molecular weights less than 800 yield foamable phenolic resole compositions that are not viscous enough to form strong, thick cell walls. The phenolic resin tends to drain from the cell walls into the struts during foaming and early curing, thus forming cell walls that are thin. The thin cell walls are easily ruptured by the expanding blowing agent and have a tendency to crack upon drying and during use.

The upper limit on the weight average molecular weight is a practical limitation. Resoles having molecular weights in excess of 1500 tend to be very viscous and quite difficult to handle. However, they can be processed into acceptable foams.

The phenolic resoles have a number average molecular weight greater than about 350, preferably from about 400 to 600 and a dispersivity greater than about 1.7, preferably between 1.8 and 2.6. If the number average molecular weight is below 350 or the dispersivity less than about 1.7, then the phenolic resole has too low of a viscosity. In addition, the phenolic resole is too reactive, i.e., it has too high and too rapid an exotherm. It is difficult to entrap the blowing agent and prevent the rupturing of the cell walls. Phenolic foams made from these resoles also have a shrinkage problem and thin cell walls. If the number average molecular weight is greater than about 600 or the dispersivity greater than 2.6, the resoles tend to be too viscous to handle and react too slowly. These upper values are practical limitations and acceptable foams can be prepared from resoles having number average molecular weights and dispersivities exceeding these levels.

The phenolic resoles of the present invention may have a free formaldehyde content of up to about 7 weight percent of the resole and a free phenol content of up to about 7 percent by weight. Preferably, the free formaldehyde and phenol are each less than about 4 percent by weight. Too much free formaldehyde may cause an odor problem. In addition, the free formaldehyde and phenol affect the reactivity and viscosity of the aqueous phenolic resole and foamable compositions.

The phenolic resoles of the present invention will generally have a viscosity of from about 1000 centipoises to about 20,000 centipoises at 16 percent water and 25° C. Preferably, the viscosity will be between about 6000 and 10,000 centipoises. The viscosity is not a critical factor so long as the molar ratios, molecular weights, and dispersivity are as set forth herein. It is possible to manufacture phenolic resoles having the above viscosities but not having the required molecular weights and dispersivity. Such resoles are not part of the present invention. Resoles having viscosities within the above range, expecially the preferred range, are desirable since they are easily formulated by conventional equipment into uniform foamable phenolic resole compositions.

In addition to phenol itself, other phenolic compounds may be substituted for up to about 10 percent of the phenol. Examples of other suitable phenolic compounds include resorcinol; catechol; ortho, meta and para cresols; xylenols; ethylphenols; p-tertbutylphenol and the like. Dinuclear phenolic compounds may also be used. The preferred phenolic resoles will contain primarily phenol itself, with only minor amounts, if any, of other phenolic compounds.

In addition to formaldehyde itself, other aldehydes may be substituted for up to about 10 percent of the formaldehyde. Examples of other suitable aldehydes are glyoxal, acetaldehyde, chloral, furfural and benzaldehyde. The preferred phenolic resoles will contain primarily formaldehyde itself, with only minor amounts, if any, of other aldehydes. The term phenolic resole as used herein is meant to include resoles containing minor amounts of phenolic compounds other than phenol and/or minor amounts of aldehyde other than formaldehyde.

The phenol reactant is added to the reactor usually as an aqueous solution. The concentration of phenol may range from about 50 weight percent to about 95 weight percent. Solutions containing less than 50 weight percent may be used, but the resulting reaction mixture is very dilute and consequently increases the reaction time necessary to obtain a resole with the desired molecular weight. It is also possible to use pure phenol; however, no advantage is obtained from using pure phenol when compared to aqueous phenolic solutions of concentrations greater than about 85 percent by weight. In the preferred method, concentrated phenolic solutions of 88 weight percent or greater are used.

The formaldehyde reactant is added to the condensation reaction as an ingredient in concentrations from about 30 to about 97 weight percent. Solutions containing less than about 30 weight percent formaldehyde may be used but the resulting reaction mixture is very dilute and consequently increases the reaction time necessary to obtain the desired molecular weight. In the preferred method, concentrated sources of formaldehyde greater than 85 percent by weight are desired. In the preferred method, paraformaldehyde is used as the source of formaldehyde.

The condensation of phenol and formaldehyde is base catalyzed. The basic catalysts generally employed are the alkali and alkaline earth metal hydroxides, carbonates, bicarbonates or oxides; however, other basic compounds may be employed. Examples of useful catalysts are lithium hydroxide, sodium hydroxide, potassium hydroxide, barium hydroxide, calcium oxide, potassium carbonate and the like. The catalysts usually employed are sodium hydroxide, barium hydroxide and potassium hydroxide. The preferred method employs potassium hydroxide.

Although the molar ratios of the phenol and formaldehyde are critical, the other parameters of the condensation reaction such as time, temperature, pressure, catalyst concentrations, reactant concentrations and the like are not critical. These parameters may be adjusted to obtain a phenolic resole having the desired molecular weight and dispersivity characteristics. It should be appreciated that in the preferred method the concentrations of the phenol, formaldehyde and catalyst are very important.

The reaction of phenol and formaldehyde is usually effected at temperatures ranging from about 50° C. to 150° C. The preferred reaction temperatures range from about 70° C. to about 95° C. It should be appreciated that the reaction time is dependent on the temperature.

The reaction pressure may vary over a wide range of from atmospheric pressure to about 6 atmospheres of pressure. The reaction may also be run at reduced pressure.

The catalyst concentration may range from about 0.005 to about 0.10 moles of base per mole of phenol. Preferably, the range is from about 0.005 to about 0.03. In the most preferred method, concentrations of catalyst of from about 0.10 moles to about 0.020 moles of base per mole of phenol are used.

The condensation reaction time will vary depending on the temperature, concentrations of reactants and amount of catalyst employed. Generally the reaction time will be at least 6 hours but no more than 20 hours. As should be appreciated, the reaction will be run until the phenolic resole has the desired molecular weight and dispersivity characteristics.

The time to terminate the reaction can be ascertained by determining the molecular weights and dispersivity as set forth herein; however, this is time consuming and there is a time lag before the results of the determination are completed. In accordance with the invention, it has been found that there is a strong correlation between bubble viscosity and molecular weights and dispersivity for any given set of molar ratios and operating parameters. For example, for the preferred commercial method of making a resole having a molar ratio of 2:1 and using concentrated phenol, concentrated formaldehyde, and high catalyst levels it has been found that a bubble viscosity of 60 seconds will correlate with molecular weights and dispersivities within the preferred ranges. Accordingly, it is possible to use bubble viscosity as an indication of when the desired molecular weights and dispersivity have been obtained; however, the actual molecular weights and dispersivity are still controlling. In addition, if any changes are made in the molar ratios or operating parameters of the process, the bubble viscosity/molecular weights and dispersivity correlation must be determined for those particular conditions.

Since the condensation reaction is catalyzed with a base, the resulting phenolic resole is alkaline. It is desirable to adjust the pH of the phenolic resole to a value of from about 4.5 to 7.0, preferably 5.0 to 6.0, in order to inhibit further condensation reactions from occurring. The pH of resole is adjusted by adding an acid or acid-forming compound. Examples of acids which may be used are hydrochloric acid, sulfuric acid, phosphoric acid, acetic acid, oxalic acid and formic acid. The preferred acid is formic acid.

The phenol formaldehyde resole is obtained as an aqueous solution ranging from about 25 to about 90 weight percent resole. The final concentration will depend on how much water is introduced with the reactants and catalysts which are generally used as aqueous solutions. In addition, water is formed as a by-product of the condensation reaction. In the preferred method, the resulting phenolic resole generally has a concentration of about 80 to 90 weight percent resole. Concentration of the phenolic resole to a particular predetermined water content is readily accomplished by conventional stripping at reduced pressures and low temperatures.

In preparing the phenol formaldehyde resole of the present invention, the phenol and formaldehyde are reacted in the presence of the basic catalyst until the resole has the desired molecular weight and dispersivity characteristics. Thereafter, the pH of the aqueous resole is adjusted and the resole cooled to about 20° C. It should be appreciated that if the aqueous resole with adjusted pH has a molecular weight that is too low, it may be further bodied until the desired molecular weight is achieved. Bodying of pH adjusted resoles to increase the molecular weight is known in the art. However, since such bodying is slow compared to the base catalyzed reaction, it is desirable to initially react and body the phenol and formaldehyde to the desired molecular weight before adjusting the pH and cooling.

The method for preparing the phenolic foam of the present invention generally comprises introducing into a substantially closed mold the phenolic resole foamable compositions of the present invention and allowing the composition to foam and cure in this mold while maintaining a pressure on the mold in excess of about 3 psi above atmospheric pressure. The phenolic resole foamable composition contains the special aqueous phenolic resole of this invention and the anhydrous aryl sulfonic acid catalyst to expel water, foam and cure the composition. The amount of phenolic resole foamable composition introduced into the mold will vary depending on the density, etc. desired of the phenolic foam but in all events will be an amount sufficient to generate a pressure against the walls of the mold of at least about 3 psi above atmospheric pressure.

The various components of the foamable phenolic resole composition may be mixed together in any order provided the resulting composition is uniform. It should be noted, however, that the preferred anhydrous aryl sulfonic acid catalyst causes the foamable composition to begin to foam within seconds of being mixed with the phenolic resole and the foaming composition reaches a maximum pressure within minutes. Accordingly, the catalyst should be the last component added to the foamable phenolic resole composition. In the preferred continuous method, some of the components may be premixed before they are metered into the mixing device. However, for the reasons set forth above, the catalyst should be the last ingredient entering the mixing device.

The anhydrous aryl sulfonic acid may be added as a solid or liquid. Liquid acids are preferred because they are easier to handle in commercial mixing devices. The anhydrous catalysts may also be added as solutions, suspensions or emulsions in organic solvents such as glycerine or glycol. Solutions, suspensions or emulsions are not preferred since they add additional ingredients which may affect the properties of the phenolic foam and tend to reduce the reactivity of the system.

Figure 1B:
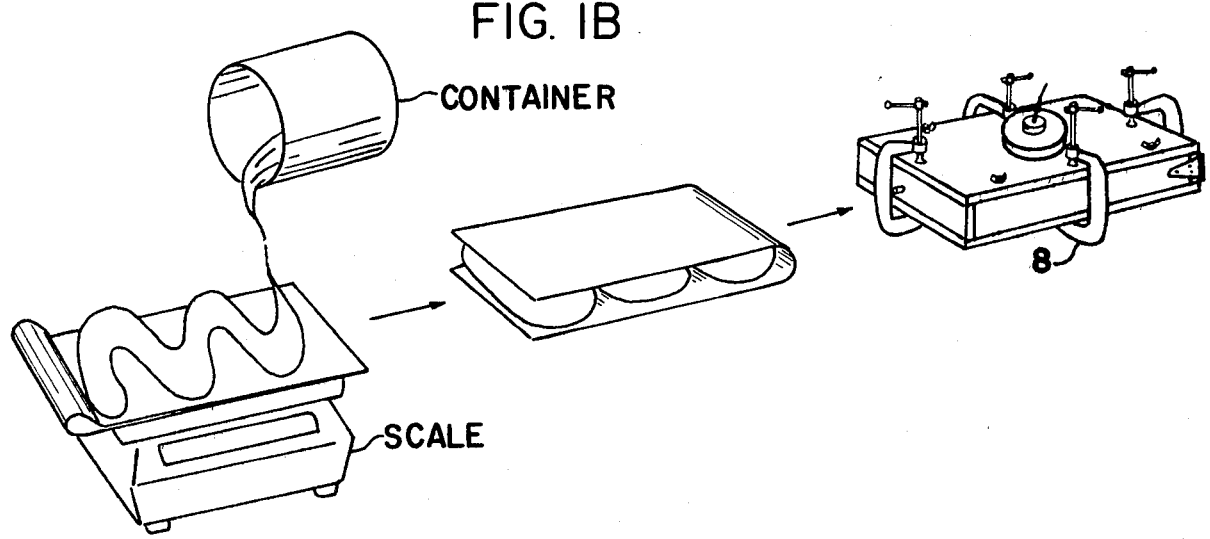

In one embodiment of the invention normally used in the laboratory, the phenolic resole foamable composition is introduced into a rigid, closed mold as illustrated, for example, in FIGS. 1A and 1B. The phenolic resole foamable composition expands initially under essentially atmospheric pressure. As the foamable composition expands to fill the mold, it generates pressure against the walls of the mold. The mold is designed to withstand pressures in excess of 15 psi above atmospheric pressure.

With respect to FIGS. 1A and 1B, the mold is comprised of top plate (1), bottom plate (2), side walls (3), and end walls (4). The side walls (3) and one end wall (4) are held together by hinges (5). When in a closed position, the top and bottom plates and the side walls are held in position by bolts (6) and wing nuts (7). In addition, in order to withstand the pressures of up to 15 psig, a series of C clamps (8) are attached around the perimeter of the molds during the foaming and curing steps. The mold is also provided with a pressure transducer (9) for measuring the pressure in the mold and a thermocouple (1) for measuring the temperature in the mold. The operation of the laboratory mold will be described more fully hereinafter. The size of the mold can be varied by changing the dimensions of the walls and plates.

In another embodiment of the invention employing a preferred continuous processing technique, the phenolic foam is produced in a double belt press type apparatus illustrated generally in FIGS. 2–5. The ingredients of the phenolic resole foamable composition of the present invention are metered in the desired ratios into a suitable mixing device (not shown) and then applied to a lower facing material (25) such as cardboard containing a thin layer of aluminum, a glass mat, a rigid substrate such as hardboard, or a vinyl skin, which material is caused to exit a container (not shown) and move along a table (29) by a lower conveyor (12). The phenolic resole foamable composition of the present invention is applied by means of a suitable distribution device (30) which moves in a back-and-forth motion transversely to the direction of movement of the lower facing material (25), although any suitable means for evenly distributing the composition such as a multiple stream mix head or a series of nozzles may be employed. As the foamable composition is carried downstream, it foams and is contacted by an upper facing material (27) directed by means of rollers (22) and (23) to the region where the foamable composition is in a very early stage of expansion. As the foamable composition expands initially under substantially ambient atmospheric pressure, it is carried into a curing cavity (28) foamed by the lower portion of an upper conveyor (11), the upper portion of the lower conveyor (12), and two fixed, rigid side walls called side rails not shown in FIG. 2 but illustrated by (41) and (42) in FIG. 3. The thickness of the foam is determined by the distance of the upper conveyor (11) from the lower conveyor (12). The upper conveyor (11) can be moved by any suitable lifting means (not shown) perpendicularly to the lower conveyor (12) which, itself, cannot be raised or lowered. When the upper conveyor (11) is raised or lowered, it moves between the fixed rigid side walls (41 and 42) as illustrated in FIG. 3, which walls are immediately adjacent to the sides of the upper conveyor (11). The surfaces of the conveyors which contact the upper and lower facing materials comprise a plurality of pressure plates (13 and 14) fixed to the conveyor by rigid attaching means (21). The pressure plates may be heated, if necessary, by means of hot air which is introduced into and circulated inside the upper and lower conveyors by means of air ducts not shown in the drawings.

Figure 4:
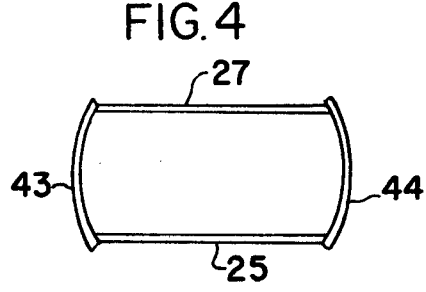
FIG. 4 illustrates diagrammatically a cross-sectional view taken along line IV—IV of FIG. 3.
Figure 5:
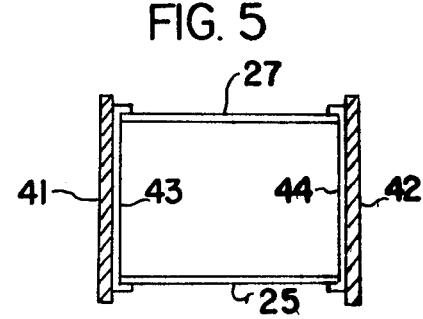
FIG. 5 illustrates diagrammatically a cross-sectional view taken along line V—V of FIG. 3.

Simultaneously with the upper and lower facing papers, side papers (43 and 44), as illustrated in FIG. 3, containing a foam-releasing material such as a thin film of polyethylene are guided into the curing cavity by rollers (45 and 46) and means such as guide bars (47 and 50). Each of the guide bars is placed just ahead of the curing cavity (28) such that the side papers (43 and 44), before contacting the side walls (41 and 42), overlap the upper and lower facing materials, for example, as illustrated in FIG. 4. As the side papers (43 and 44) contact the side walls (41 and 42), they flatten as illustrated in FIG. 5.

When the foam has expanded to fill the thickness of the curing cavity, further expansion is constrained by the pressure plates (13 and 14) as illustrated in FIG. 2, and the side walls (41 and 42) as illustrated in FIG. 3. The pressure exerted by the foam on the pressure plates and side walls will vary as described herein but typically will be in the range of about 3 pounds per square inch to about 15 pounds per square inch. The pressure plates (13 and 14) and side walls (41 and 42) are designed to withstand such pressures.

Processing parameters such as the amounts of the components of the foamable phenolic resole composition, the flow rate of the composition from the distribution device, and the conveyor speed may be varied widely in the practice of the invention to provide phenolic foam having the desired density. Sufficient foamable composition must be used to ensure that the foaming composition fills the curing cavity and exerts a pressure against the cavity walls. The conveyor speed must be run at a speed to ensure that the foaming composition is in the mold before full expansion has taken place.

After the phenolic foam leaves the curing cavity, the side papers (43 and 44) are removed, for example, by means of rollers (48 and 49), as illustrated in FIG. 3. The foam may be cut to desired lengths depending on the intended use.

The phenolic resole foamable composition used in the method of the invention generally comprises the aqueous phenolic resole of the present invention, a fluorocarbon blowing agent, a surfactant, and the anhydrous aryl sulfonic catalyzing acid of the present invention. The ratios of the various ingredients are set forth below. The preferred compositions also contain a plasticizer and a formaldehyde scavenger.

The amount of aqueous phenolic resole present in the phenolic resole foamable compositions used in the invention to produce substantially closed-cell phenolic foams may vary within wide limits provided it is in an amount sufficient to produce such foam having the desired density and compressive strength. Generally, the amount of phenolic resole present in the foamable composition ranges from about 40 percent to about 70 percent by weight of the composition. An amount in the range of from about 45 percent to about 55 percent by weight of the foamable composition is preferred. The weight percent of phenolic resole is based on 100 percent active phenolic resole. Since the resole is an aqueous solution, the actual concentration of the resole must be accounted for in calculating how much of the aqueous resole solution goes into the foamable phenolic resole composition.

Any suitable blowing agent may be used. In choosing the blowing agent it must be remembered that the k factor of the phenolic foam is directly related to the k factor of the blowing agent entrapped in the phenolic foam. Although blowing agents such as n-pentane, methylene chloride, chloroform and carbon tetrachloride may be used, they are not preferred since they do not have the excellent thermal insulation properties of fluorocarbon blowing agents. In addition, fluorocarbon blowing agents are not soluble in the phenolic foam and hence will not diffuse out over time, while some of the above mentioned blowing agents have a certain compatibility with the phenolic foam and hence may diffuse out over time. They may be used, however, in combination with the preferred fluorocarbon blowing agents. Examples of suitable fluorocarbon blowing agents include: dichlorodifluoromethane; 1,2-dichloro-1,1,2,2-tetrafluoroethane; 1,1,1-trichloro-2,2,2-trifluoroethane; trichloromonofluoromethane; and 1,1,2-trichloro-1,2,2-trifluoroethane. It is preferred that the blowing agent comprise a chlorofluorocarbon blowing agent. The blowing agent may be a single blowing agent compound or it may be a mixture of such compounds. Ordinarily, the fluorocarbon blowing agents employed have boiling points at atmospheric pressure, viz., an absolute pressure of 760 millimeters of mercury, in the range of from about $-5°$ C. to about 55° C. An atmospheric boiling point in the range of from about 20° C. to about 50° C. is typical. The preferred blowing agent is a mixture of trichloromonofluoromethane and 1,1,2-trichloro-1,2,2-trifluoroethane. It is especially preferred that the weight ratio of the trichloromonofluoromethane to the 1,1,2-trichloro-1,2,2-trifluoroethane in the mixture be from about 1:1 to about 1:3.

The blowing agent generally is present in the foamable composition in an amount which will produce substantially closed-cell phenolic foam having an initial low k factor. The amount of blowing gent may vary widely but it generally ranges from about 5 percent to about 20 percent by weight of the foamable composition. An amount of blowing agent in the range of from about 5 percent to about 15 percent by weight of the foamable composition is typical. An amount in the range of from about 8 percent to about 12 percent by weight is preferred.

The phenolic resole foamable composition also contains a surfactant. The surfactant should exhibit properties which enable it to effectively emulsify the phenolic resole, blowing agent, catalyst and optional additives of the foamable composition. To prepare a good foam, the surfactant should lower the surface tension and stabilize the foam cells during expansion. It has been found that non-ionic, non-hydrolyzable silicone glycol surfactants are most useful, although any surfactant having the requisite properties described above may be employed. Specific examples of suitable surfactants include L-7003 silicone surfactant, L-5350 silicone surfactant, L-5420 silicone surfactant and L-5340 silicone surfactant (which is preferred), all from Union Carbide Corporation, and SF1188 silicone surfactant from General Electric Company. Another class of surfactants which may be used are the non-ionic organic surfactans such as the condensation products of alkylene oxides such as ethylene oxide, propylene oxide or mixtures thereof, and alkylphenols such as nonylphenol, dodecylphenol and the like. Other suitable organic surfactants are known and include, for example, those disclosed in U.S. Pat. No. 3,389,094, so much of which as regards organic surfactants is hereby incorporated by reference.

Another class of suitable surfactants which may have application in the present invention include siloxane-oxyalkylene copolymers such as those containing Si-I-C as well as Si-C linkages. Typical siloxane-oxyalkylene copolymers contain a siloxane moiety composed of recurring dimethylsiloxy units endblocked with monomethylsiloxy and/or trimethylsiloxy units and at least one polyoxyalkylene chain composed of oxyethylene and/or oxypropylene units capped with an organic group such as an ethyl group. Specific examples of suitable siloxane-oxyalkylene polymers may be found in U.S. Pat. No. 3,271,331, so much of which as regards siloxane-oxyalkylene surfactants is hereby incorporated by reference. Care must be taken in selecting the surfactant since some surfactants will adversely affect the viscosity of the foamable phenolic resole composition or cause the collapse of the foam before it is set.

The surfactant used in the foamable composition may be a single surfactant or a mixture of surfactants. The surfactant is used in the present invention in an amount sufficient to produce a good emulsion. Generally, the amount of surfactant ranges from about 0.1 percent to about 10 percent by weight of the foamable phenolic resole composition. Typically, the amount of surfactant ranges from about 1 percent to about 6 percent by weight of the composition. An amount of surfactant in an amount of from about 2 percent to about 4 percent by weight of the composition is preferred.

The surfactant may be separately mixed with the phenolic resole, blowing agent and catalyst to form the foamable phenolic resole composition or it may be admixed with the phenolic resole or blowing agent before blending with the other components. Alternatively, part of the surfactant may be premixed with the phenolic resole and part may be premixed with the blowing agent. It is preferred that about ⅓ of the surfactant be premixed with the fluorocarbon blowing agent and ⅔ be premixed with the phenolic resole.

Although water is believed to be the main cause of perforations in the cell walls and to contribute to the rupturing of cell walls, the presence of water is necessary. First of all, it is very difficult and expensive to produce a phenolic resole that has very little or no water. Moreover, phenolic resoles having characteristics of the resoles of the invention without water are extremely difficult to handle. They are very viscous and difficult to formulate into foamable compositions. In addition, it is difficult to control the exotherm of the reaction without water. Accordingly, water is necessary in the phenolic resole foamable composition to adjust the viscosity of the phenolic resole and the phenolic resole foamable composition to that which is favorable for producing phenolic foams. In addition, water is desirable to act as a heat sink and help control the exothermic foaming and curing reaction. Most of the water is present in the aqueous phenolic resole although very limited amounts may be tolerated in the fluorocarbon blowing agent or surfactant. Only limited quantities may be tolerated in the anhydrous aryl sulfonic acid catalyst. The phenolic resole foamable composition will contain at least about 5 percent water. Concentrations of water above 20 percent should be avoided since even the preferred catalyst cannot expel sufficient water to substantially eliminate the ruptures and perforations when this much water is originally present in the foamable composition. An amount ranging from about 7 percent to about 16 percent by weight is preferred. As stated above, limited amounts of water can be tolerated in the blowing agent, surfactant, or catalyst if phenolic foam having cell walls free of perforations and ruptures caused by water are to be prepared. In addition, it is important that the water in the aqueous resole is uniformly mixed with the resole. If the aqueous resole contains water that is not uniformly mixed with the resole, the result may be ruptured cell walls.

As mentioned herein, the anhydrous aryl sulfonic acid of the present invention serves a dual purpose. The anhydrous aryl sulfonic acid expels some water from the phenolic resole, thereby enabling the formation of a phenolic foam without ruptures or perforations caused by water. The anhydrous aryl sulfonic acid also catalyzes the foaming and curing reaction to form a thermoset phenolic foam. All aryl sulfonic acids will not work in the present invention. Only those aryl sulfonic acids having high resin compatibility and low water compatibility in the range of ingredients of the foamable phenolic resole composition will work. One can readily determine if the anhydrous aryl sulfonic acid will be acceptable by preparing a phenolic foam using the anhydrous aryl sulfonic acid and taking a scanning electron photomicrograph of the foam. Acceptable foams will not have perforations or ruptures caused by water in the cell walls. Examples of suitable anhydrous aryl sulfonic acids are set forth herein. As mentioned, the preferred catalysts are toluene sulfonic acid and xylene sulfonic acid. Commercial grades of mixtures of anhydrous toluene sulfonic acid and xylene sulfonic acid are available and are thus preferred for use in the present invention. The most preferred catalyst is toluene sulfonic acid since it is the most efficient in expelling water. However, pure toluene sulfonic acid is a solid and it is difficult to prepare uniform foamable phenolic resole compositions on a commercial scale using a solid catalyst. It has been found that the use of xylene sulfonic acid improves the handling characteristics without affecting the properties of the resulting foam. Accordingly, anhydrous toluene sulfonic acid containing about 10–50 percent by weight xylene sulfonic acid is most preferred.

Examples of some aryl sulfonic acids which have been found to be unacceptable because they will not sufficiently change the resole/water compatibility are phenol sulfonic, substituted phenol sulfonic, xylenolsulfonic, substituted xylenolsulfonic and dodecyl benzene sulfonic acid.

The amount of anhydrous aryl sulfonic acid present in the phenolic resole foamable composition will vary depending on such factors as the amount of water in the foamable composition and the type and characteristics of the phenolic resole. Amounts of anhydrous aryl sulfonic acid in the range of about 2 to about 6 percent by weight are sufficient to foam and cure most phenolic resole compositions; however, this amount is insufficient to expel the water and produce phenolic foams without ruptures or perforations in the cell walls or to cure the resin fast enough to entrap the blowing agent. In accordance with the present invention, the anhydrous sulfonic acid is present in amounts of at least about 6 percent by weight of the foamable compositions. Less than 6 percent does not adequately control the effect of water on the formation of cell walls without ruptures or perforations or cure the phenolic resole quickly enough. The upper limit on the amount of anhydrous sulfonic acid used is determined by such factors as the amount and properties of the phenolic resole; however, amounts greater than 20 percent by weight generally cause the foaming and curing to exotherm too quickly, thus driving off the fluorocarbon blowing agent before the cells are formed sufficiently to entrap the fluorocarbon blowing agent. Amounts greater than 20 percent may be necessary if the acid is a monohydrate or if the foamable composition contains the maximum amount of water. The preferred amounts are from 12-16 percent by weight.

In addition to the aqueous phenolic resole, fluorocarbon blowing agent, anhydrous aryl sulfonic acid, and surfactant, the phenolic resole foamable compositions of the present invention may contain other materials known in the art in their customary amounts for their customary purposes. Examples of such optional ingredients are as follows. Urea or resorcinol may be added to scavenge free formaldehyde, generally in the range of from 0.5 to 5.0 percent by weight. Plasticizers such as triphenyl phosphate, dimethyl terephthalate or dimethyl isophthalate may also be added in amounts essentially from about 0.5 to 5 percent by weight. Anti-glow, anti-spalling and anti-punking agents may also be added in amounts usually ranging from about 0.5 to 5 percent by weight. Preferred phenolic resole foamable compositions contain about 3 percent by weight urea and about 3 percent by weight plasticizer. The urea and plasticizer are preferably premixed with the phenolic resole before it is mixed with the other ingredients of the foamable phenolic resole composition.

The values of the various properties of the phenolic resoles and the phenolic foam produced therefrom were, unless otherwise set forth, determined in accordance with the following methods.

Viscosity reported herein as bubble viscosity was determined at 25° C. in a Gardner-Holdt bubble viscosity tube in accordance with ASTM D-1545-76 and is reported herein as seconds, bubble seconds or bubble viscosity.

Viscosity reported in centipoise (cps.) was determined by use of a Brookfield Viscometer Model RVF. Measurements were made when the resole was 25° C. and the spindle was chosen to give a near mid range reading at 20 rpm. Spindle number 5 was employed for most readings. (ASTM D-2196)

The pH of the resole was measured using the Fisher Accumet pH Meter Model 610 A. The pH probe was standardized with pH standards at 4.0, 7.0, and 10.0 before each use. (ASTM E-70)

The content of phenol in the resole was measured using an infrared spectrophotometric determination. The infrared determination was carried out using a recording infrared spectrophotometer with sodium chloride optics (Perkin Elmer Model No. 21), sealed liquid absorption cells, and sodium chloride windows of 0.1 mm. The method consisted of measuring the infrared absorbance of an acetone solution of the phenolic resole at 14.40 microns. The phenol content of the resole sample was then determined by comparing the absorbance of the sample with the absorbance of standard solutions of known phenol content measured under identical conditions. This method has been found to be reproducible to ±0.14 percent phenol.

The free formaldehyde content in the phenolic resole was determined by the hydroxylamine hydrochloride method. The general method comprises dissolving the resole sample in methanol, adjusting the pH to bromophenol blue endpoint and adding an excess of hydroxylamine hydrochloride. The reaction liberates hydrochloric acid which is titrated with standard sodium hydroxide to the same bromophenol blue endpoint.

First, a sample of the resole is weighed to the nearest 0.1 milligram (usually 1-3 gram sample) in a 150 cc beaker containing 10 cc of methanol. The mixture is stirred until the resole is completely dissolved. The weight of resole sample used should be such that more than ⅓ of the hydroxylamine hydrochloride remains after the reaction is complete. After the resole is dissolved in the methanol, 10 cc of distilled water and 10 drops of bromophenol blue indicator are added. The pH of the sample solution is adjusted by adding 0.5 N sodium hydroxide or 0.5 N sulfuric acid dropwise until the indicator just turns blue. Then 25 cc of hydroxylamine hydrochloride solution (ACS grade) is pipetted into the beaker and the reaction allowed to proceed at room temperature for 15 minutes. Then the solution is titrated rapidly with 0.5 N sodium hydroxide solution to the blue color to which the sample solution had been previously adjusted. The sample solution is magnetically stirred during the titration and the stirring intensity is very vigorous as the endpoint is approached. Simultaneously with the above, the same procedure is followed for a blank using all ingredients except the sample resole. The free formaldehyde of the sample is then calculated as follows:

$$\% \text{ Free Formaldehyde} = \frac{(V_1 - V_2) \times N \times 3.001}{W}$$

where $V_1$ = volume of 0.5 N sodium hydroxide solution used for sample titration expressed in cc.

$V_2$ = volume of 0.5 N sodium hydroxide solution used for blank titration expressed in cc.

N = normality of sodium hydroxide solution.

W = weight of sample of resole expressed in grams.

3.001 = constant factor to convert the gram equivalent weight of formaldehyde to percent.

For additional information on this procedure see Kline, G. M., "Analytical Chemistry of Polymers", High Polymers, Vol. II Part 1, Interscience Publishers, Inc. 1959).

Water content of the resoles was measured in accordance with the method of Karl Fischer, modified to determine the endpoint of the titration electrometrically. The instrument used was an Automatic Karl Fischer Titrator, Aquatest II from Photovolt Corp. and the apparatus was assembled, filled and electrically connected in accordance with the manufacturer's instructions. An appropriate sample of the resole as suggested in the following table is weighed into a clean, dry volumetric flask. From 20–50 cc dry pyridine or methanol is added to the flask, the flask capped and the solution stirred thoroughly until the resole sample is completely dissolved. The solution is diluted to volume with dry pyridine or methanol, the flask capped with a sleeve-type rubber stopper, and the flask shaken to mix the solution.

TABLE OF ESTIMATED SAMPLE SIZE

| Resole Weight (grms) | Final Sample Solution (cc) | Anticipated Water (Wt %) |
|---|---|---|
| 3–4 | 50 | 0.3–5 |
| 2–3 | 100 | 5–15 |
| 1–2 | 100 | 15–25 |
| 1 | 100 | >25 |

Using an appropriate dry syringe and needle, 1 or 2 cc of the sample to be tested is drawn into the syringe and discharged into a waste container. This rinsing is repeated several times. Then the sample is drawn into the syringe until the volume is slightly beyond the desired calibration mark and then adjusted to the desired mark. The needle of the syringe is wiped clean with a tissue and the needle inserted through the sample port septum until it is under the surface of the titrating solution. The sample is then injected into the titration solution and the syringe quickly withdrawn. The automatic titration is activated and the results recorded when the titration is completed. In the same manner as described above, the water content of a blank is determined. The weight percent of water is calculated as follows:

$$\text{Water Content (wt. \%)} = \frac{(C_1 - C_2)\left(\frac{V_2}{V_1}\right)}{W \times 10,000}$$

where $C_1$ = readout number indicating total $\mu$g of water in sample analyzed.

$C_2$ = readout number indicating total $\mu$g of water in blank.

$V_2$ = volume to which dissolved sample was diluted in cc.

$V_1$ = volume of sample titrated in cc.

$W$ = weight of resole sample in grams.

For additional information on this procedure see Mitchell, J. Sr., and Smith, D. M., "Aquametry", Chemical Analysis Series, Vol. 5, Interscience Publishers Inc. (1948).

The weight average molecular weight, number average molecular weight and dispersivity of the resoles were determined by Gel Permeation Chromatography. The instrument used was the Gel Permeation Chromatograph of Waters Associates, Inc. having five columns arranged in series (each column 1 foot in length) packed with Styragel. The pore sizes of the Styragel were as follows and in the following order: 1 column of 1000 Å, 2 columns of 500 Å, 2 columns of 100 Å. Detection was by differential refractive index (Waters Differential Refractometer R401). The system was operated with tetrahydrofuran (THF) as the solvent and at a flow rate of 2 mls/minute. The sample of resole weighing about 220–250 mgs was dissolved in 25 ml of THF. To avoid variations due to solvent evaporation, the solutions were transferred with minimal exposure to air and were weighed in stoppered flasks. The GPC was calibrated using monodispersed polystyrene as the standard polymer against which the resole was measured. The calibration was conducted at room temperature using THF as the solvent for the polystyrene. The results of the GPC were recorded and reduced on a recorder data processor from Waters Associates (730 Data Module) which performed all calculations and printed the final results of the analysis. For detailed information on the operation see Waters literature. See, also, Waters publication No. 82475 entitled, "GPC, Data Reduction & the 703-150 C Combination" and Waters Technical Brief No. 102, "HPLC Column Performance Rating".

Unfaced core samples were used to measure k factors by ASTM C 518 revised.

The invention is useful in the production of phenolic foam thermal insulation for widely varying domestic and industrial uses. The invention is particularly advantageous as a method of producing phenolic foams having excellent insulation properties from foamable compositions based on phenolic resoles produced from relatively low cost phenol and formaldehyde, preferably as paraformaldehyde. Phenolic foam produced according to the method of the invention exhibits not only a good initial k factor but also good k factor retention unlike phenolic foams generally known in the art. Thus, the method of the invention meets a long sought-after but heretofore unrealized goal of producing a phenolic foam having both good initial k factor and good k factor retention from phenolic resoles such as simple phenol formaldehyde resole and thereby represents an important advancement in the phenolic foam art.

The following examples illustrate the invention. Parts and percentages are by weight unless specified otherwise.

EXAMPLE 1

A phenol formaldehyde resole having a molar ratio of formaldehyde to phenol of 2:1 of the present invention was prepared in the laboratory in a 4-liter reactor equipped with a reflux condenser, a thermocouple for reading temperatures in °C., an addition funnel, an air stirrer with double blade impeller, and means for heating (mantle) and cooling (ice bath) the reactor. First, 1434 grams of 90 percent phenol (13.73 moles) was weighed out and added to the reactor. Then 1207 grams of flake 91 percent paraformaldehyde (36.61 moles) was weighed out and added to the reactor. This phenol-formaldehyde mixture was stirred while being heated to 78° C. In the meantime, a solution of 45 percent aqueous KOH was prepared. Then 35.53 grams of the 45 percent KOH solution (0.285 moles) was added to 478.4 grams of 90 percent phenol (4.58 moles) and thoroughly mixed. This KOH-phenol mixture was then charged to the addition funnel. When the reactor temperature reached 78° C., the KOH-phenol solution was added by dropwise addition over a 150-minute period. During the addition period, the temperature in the reactor was maintained in the range of 78° C. to 80° C. by heating and/or cooling the reactor. In the early stages of addition, it was necessary to occasionally cool the reactor to control the exothermic reaction. Also during the early stages, a slight gel developed which disappeared during the addition period. Close attention to the temperature was observed when the gel was present since the heat transfer through a gel is somewhat slow.

After all of the phenol-KOH mixture was added, the reaction mixture was heated to 85° C.–88° C. and maintained at this temperature. Bubble viscosities were run at a temperature of 25° C. in a Gardner-Holdt bubble viscosity tube (ASTM D-1545-76) on samples of the reaction mixture taken every 30 minutes after the temperature reached 85° C–88° C. When a bubble viscosity of about 15 sec. was obtained, the reaction mixture was cooled gradually ($\approx 15$ min.) to a temperature of about 68° C.–79° C. When this temperature was reached and maintained, bubble viscosities were again run every 30 minutes until a bubble of about 30 sec. was obtained. The bubble viscosities were then determined every 15 minutes until a bubble viscosity of about 60 sec. was obtained. At a 60 sec. bubble viscosity 15.57 grams of a 90 percent formic acid solution (0.285 mole) was added to the reactor and the reaction mixture cooled to 55° C. When the reactor temperature reached 55° C., 190 grams Morflex 1129 (dimethyl isophthalate) was added and allowed to dissolve. The reaction mixture was then transferred to a storage container and was stored in a refrigerator until used. The resulting resole had a Brookfield viscosity of 6,600 centipoise at 25° C. The resole contained 1.9 percent free phenol, 3.6 percent free formaldehyde, and 17.3 percent water. The weight average molecular weight as 981, the number average molecular weight was 507, and the dispersivity was 1.93.

EXAMPLE 2

A phenol formaldehyde resole of the present invention having a molar ratio of formaldehyde to phenol of 2:1 was prepared on a commercial scale in a 1,000-gallon reactor equipped with a reflux condenser, a thermocouple for reading temperatures in °C., means for accurately adding chemicals, means for agitating the mixture, and means for heating and cooling the reaction mixture.

First, 3,805.63 pounds of 90 percent phenol (16,542.3 gram moles) was charged to the reactor. Then 3,203.16 pounds of flake 91 percent paraformaldehyde (44,111.78 gram moles) was charged to the reactor with agitation. This phenol-formaldehyde mixture was stirred while being heated to 78° C. and held at this temperature for about two hours.

In the meantime, in a blend tank a solution of KOH and phenol was prepared by thoroughly mixing 1,268.55 pounds of 90 percent phenol (5,514.14 gram moles) and 94.44 pounds of 45 percent KOH solution (343.92 gram moles).

After two hours and with the reactor temperature initially at 78° C., the KOH-phenol solution was added to the reactor at a rate of 0.90–1.35 gallons per minute over a 2½ hour period. During the addition period, the temperature in the reactor was maintained in the range of 78° C.–82° C. by heating and/or cooling the reactor or temporarily stopping the addition of the phenol-KOH.

After all of the phenol-KOH mixture was added, the reaction mixture was heated to 85° C.–88° C. and maintained at this temperature. Bubble viscosities were run at a temperature of 25° C. in a Gardner-Holdt bubble viscosity tube (ASTM D-1546-76) on samples of the reaction mixture taken every 30 minutes after the temperature reached 85° C.–88° C. When a bubble viscosity of about 15 sec. was obtained, the reaction mixture was cooled gradually to a temperature of about 68° C.–79° C. When this temperature was reached, bubble viscosities were again run every 15 minutes until a bubble of about 30 sec. was obtained. The bubble viscosities were then determined every 15 minutes until a bubble of about 60 sec. was obtained. At a 60 sec. bubble viscosity, 38.72 pounds of a 90 percent formic acid solution (343.90 gram moles) was added to the reactor and the reaction mixture cooled to 55° C. When the reaction mixture reached 55° C., 235 pounds Morflex 1129 was added and allowed to dissolve. The reaction mixture was then transferred to a storage tank and kept cool until used. The resulting resole had a Brookfield viscosity of 7,400 at 25° C. The resole contained 3.2 percent free phenol, 3.5 percent free formaldehyde, and 14.6 percent water. The resole had a weight average molecular weight of 1222, a number average molecular weight of 550, and a dispersivity of 2.22.

EXAMPLE 3

A phenol formaldehyde resole of the present invention having a molar ratio of formaldehyde to phenol of 2:1 was prepared in the laboratory using the preferred process in a 4-liter reactor equipped with a reflux condenser, a thermocouple for reading temperatures in °C., an addition funnel, an air stirrer with double blade impeller, and means for heating (mantle) and cooling (ice bath) the reactor. First, 2550 grams of 90 percent phenol (24.4 moles) was weighed out and added to the reactor. Then 45.6 grams of 45 percent KOH solution (0.366 moles) was weighed out and added to the reactor. This phenolcatalyst mixture was agitated while being heated to 78° C. In the meantime, 1610 grams of 91 percent paraformaldehyde flake (48.8 moles) was weighed out. When the reactor temperature reached 78° C., one-tenth of the paraformaldehyde flake (161.0 grams) was added to the reactor. This incremental addition of paraformaldehyde was performed in a total of 10 substantially equal additions staggered at 10 minute intervals. During the addition period, the temperature was maintained between about 78°–82° C.

After all of the paraformaldehyde was added, the reaction mixture was heated to 85° C.–88° C. and maintained at this temperature. Bubble viscosities were run at a temperature of 25° C. in a Gardner-Holdt bubble viscosity tube (ASTM-D-1545-76) on samples of the reaction mixture taken every 30 minutes after the temperature reached 85°–88° C. When a bubble viscosity of about 15 sec. was obtained, the reaction mixture was cooled gradually ($\approx 15$ min.) to a temperature of about 78° C. When this temperature was reached, bubble viscosities were again run every 15 minutes until a bubble of about 60 sec. was obtained. At a 60 sec. bubble viscosity, 18.7 grams of a 90 percent formic acid solution (0.366 mole) was added to the reactor and the reaction mixture cooled to 65° C. When the reaction mixture reached 65° C., 190 grams Morflex 1129 (dimethyl isophthalate) was added and allowed to dissolve. The reaction mixture was then transferred to a storage container and was stored in a refrigerator until used. The resulting resole had a Brookfield viscosity of 6,000 centipoise at 25° C. The resole contained 2.3 percent free phenol, 3.4 percent free formaldehyde, and 17.5 percent water. The resole had a weight average molecular weight of 902, a number average molecular weight of 448, and a dispersivity of 2.01.

EXAMPLE 4

A phenol formaldehyde resole of the present invention having a molar ratio of formaldehyde to phenol of 2:1 was prepared on a commercial scale using the preferred process in a 6000-gallon reactor equipped with a reflux condenser, a thermocouple for reading temperatures in °C., means for accurately adding chemicals, means for agitating the mixture, and means for heating and cooling the reaction mixture.

First, 30,325 pounds of 90 percent phenol (131,700.8 gram moles) was charged to the reactor. Then 565 pounds of 45 percent KOH solution (2055.8 gram moles) was charged to the reactor with agitation. This mixture was stirred while being heated to 78° C.

In the meantime, 19,183 pounds of 91 percent paraformaldehyde flake (263,942.7 gram moles) was weighed out.

When the reactor temperature reached 78° C., the paraformaldehyde flake was metered into the reactor at a substantially even rate over a period of three hours. During the addition period, the temperature in the reactor was maintained in the range of 78°-82° C.

After all of the paraformaldehyde was added, the reaction mixture was heated to 85°-88° C. and maintained at this temperature. Bubble viscosities were run at a temperature of 25° C. in a Gardner Holdt bubble viscosity tube (ASTM D-1546-76) on samples of the reaction mixture taken every 30 minutes after the temperature reached 85°-88° C. When a bubble viscosity of about 15 sec. was obtained, the reaction mixture was cooled to a temperature of about 78° C. When this temperature was reached and maintained, bubble viscosities were again run every 15 minutes until a bubble of about 45 sec. was obtained. Then the temperature was cooled to 68°-70° C. and bubble viscosities were then determined every 15 minutes until a bubble of about 60 sec. was obtained. At a 60 sec. bubble viscosity, 209 pounds of a 90 percent formic acid solution (1854.8 gram moles) was added to the reactor and the reaction mixture cooled to 55° C. While cooling the reaction mixture to 55° C., 2114 pounds Morflex 1129 was added and allowed to dissolve. The reaction mixture was then transferred to a storage tank and kept cool until used. The resulting resole had a Brookfield viscosity of 8,700 at 25° C. The resole contained 3.7 percent free phenol, 2.92 percent free formaldehyde, and 15.6 percent water. The resole had a weight average molecular weight of 1480, a number average molecular weight of 582, and a dispersivity of 2.55.

EXAMPLE 5

A phenolic resole having a molar ratio of formaldehyde to phenol of 2:1 was prepared in the laboratory in accordance with the procedure set forth in Example 3 except the reaction was terminated, the pH adjusted, Morflex 1129 added and the resole solution cooled when a bubble viscosity of 10 seconds was obtained.

The resulting resole had a Brookfield viscosity of 850 cps. at 25° C. The resole contained 4.1 percent free phenol, 4.9 percent free formaldehyde and 14.0 percent water. The resole had a weight average molecular weight of 519, a number average molecular weight of 400, and a dispersivity of 1.26.

EXAMPLE 6

A phenol formaldehyde resole of the present invention having a molar ratio of formaldehyde to phenol of 2:1 was prepared in the laboratory in a 4-liter reactor equipped as set forth in Examples 1 and 3. First, 2550 grams of 90 percent phenol (24.4 moles) was weighed out and added to the reactor. Then 1610 grams of 91 percent paraformaldehyde was weighed out and added to the reactor. This phenol-formaldehyde mixture was stirred and heated to 70° C. In the meantime, while heating the phenol-formaldehyde mixture, a 45 percent KOH solution was prepared. When the temperature reached 70° C., 1/6 of the KOH solution was added (7.6 grams, 0.061 mole). After 10 minutes, another 1/6 of the KOH solution was added. The remainder of the KOH was added in the same manner and the reaction mixture allowed to exotherm to reflux conditions and maintained at reflux for 30 minutes. The reaction mixture was then cooled to 78° C. and reacted at this temperature until a bubble viscosity of 80 seconds was achieved. The pH was then adjusted by the addition of 18.7 grams (0.336 mole) of 90 percent formic acid. The phenolic resole solution was then cooled to 65° C. and 190 grams of Morflex added and the solution further cooled to 55° C. The resole solution was then transferred to a storage container and kept refrigerated until used.

The resulting resole had a Brookfield viscosity at 25° C. of 7,500 cps. The resole contained 2.4 percent phenol, 3.2 percent formaldehyde, and 15.8 percent water. The resole had a weight average molecular weight of 1055, a number average molecular weight of 534, and a dispersivity of 1.98.

EXAMPLE 7

A phenol formaldehyde resole of the present invention having a molar ratio of formaldehyde to phenol of 2:1 was prepared in the laboratory using the equipment and general procedure set forth in Examples 1 and 3 with the following changes.

First, 1434 grams of 90 percent phenol (13.73 moles) was charged to the 4-liter reactor. Then 1207 grams of 91 percent paraformaldehyde flake (36.61 moles) was charged to the reactor. This phenol-formaldehyde mixture was stirred and heated to 78° C. In the meantime, a 45 percent KOH solution was prepared and 35.53 grams of this 45 percent KOH solution (0.285 mole) was added to 478 grams of 90 percent phenol (4.58 moles) and this KOH-phenol mixture was mixed. The KOH-phenol mixture was then charged to the addition funnel. When the phenol-formaldehyde mixture reached a temperature of 78° C., the KOH-phenol mixture was added dropwise over a 150 minute addition period. The remainder of the reaction was performed in accordance with Example 3.

The phenolic resole had a Brookfield viscosity of 6000 centipoise at 25° C. The resole had 3.2 percent phenol, 3.2 percent formaldehyde, and 15.1 percent water. The resole had a weight average molecular weight of 1156, a number average molecular weight of 543, and a dispersivity of 2.13.

EXAMPLE 8

A phenol formaldehyde resole was prepared in the laboratory in accordance with the procedure set forth in Example 3 except the molar ratio of formaldehyde to phenol was 1.6:1.

The resulting phenolic resole had a Brookfield viscosity of 6,200 at 25° C. The resole had 1.5 percent formaldehyde, 3.7 percent phenol, and 16 percent water. The resole had a weight average molecular weight of 1248, a number average molecular weight of 532.6, and a dispersivity of 2.36.

EXAMPLE 9

A phenol formaldehyde resole was prepared in the laboratory in accordance with the procedure set forth in Example 3 except the molar ratio of formaldehyde to phenol was 2.4:1.

The resulting phenolic resole had a Brookfield viscosity of 6,400 at 25° C. The resole had 6.7 percent formaldehyde, 1.5 percent phenol, and 18.8 percent water. The resole had a weight average molecular weight of 1030, a number average molecular weight of 561, and a dispersivity of 1.85.

EXAMPLE 10

A phenol formaldehyde resole was prepared in the laboratory following the procedure set forth starting at column 29, line 15 for Resole No. III of U.S. Pat. Nos. 4,176,106 and 4,176,216.

The resulting phenolic resole had 7.3 percent formaldehyde, 5.6 percent phenol, and 7.9 percent water. The resole had a weight average molecular weight of 688, a number average molecular weight of 440, and a dispersivity of 1.56.

EXAMPLE 11

A phenol formaldehyde resole was prepared in accordance with Example 10. After the resole was prepared, the water content was adjusted to 16 percent. Then the resole was heated to 68°-70° C. and maintained at this temperature until a bubble viscosity of 80 seconds was obtained.

The resulting resole had 5.4 percent formaldehyde, 2.3 percent phenol and 14.8 percent water. The resole had a weight average molecular weight of 882, a number average molecular weight of 515.8, and a dispersivity of 1.71.

EXAMPLE 12

A phenolic resole was prepared in accordance with Example 17 of U.S. Pat. No. 3,953,645.

The resulting resole had 1.9 percent formaldehyde, 8.8 percent phenol and 10.8 percent water. The phenolic resole had a weight average molecular weight of 2295, a number average molecular weight of 590, and a dispersivity of 3.89.

EXAMPLE 13

A phenolic foam was prepared in the laboratory using the laboratory mold illustrated in FIGS. 1A and 1B. The mold was made with ½-inch thick aluminum bars for the sides and ¼-inch thick aluminum plates for the top and bottom and had inside dimensions of 9⅞"×13"×2". The dimensions of the mold may be modified, for example, by substituting 1.5" or 3" wide bars for the 2" sides.

The mold was coated with a mold release agent and preheated in a 150° F. oven. A piece of dry corrugated cardboard of about 9⅞" was dried in a 150° F. oven for about 10-15 minutes. While the mold and cardboard were in the oven, the phenolic resin foamable composition was prepared as follows. First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L-7003). This fluorocarbon blowing agent mixture was put in an ice bath and cooled to 50°-66° F. Then 76.6 parts (254.3 grams) of an aqueous phenolic resole prepared as in Example 1 was mixed with the high speed air mixer with 2.4 parts (8.0 grams) of silicone surfactant L-7003. The fluorocarbon blowing agent/surfactant premix was then mixed with the phenolic resole/surfactant premix. This mixture of phenolic resole, blowing agent and surfactant was cooled in the ice bath to 50°-55° F. Then 10 parts (33.2 grams) of an anhydrous toluene sulfonic acid/xylene sulfonic acid mixture (ULTRA-TX acid from WITCO Chemical) was weighed into a syringe and cooled to 40°-45° F. The cardboard and mold were removed from the oven. The anhydrous aryl sulfonic acid catalyst was then mixed with the phenolic resole, blowing agent and surfactant mixture at high rpm for 10-15 seconds. Then 210 grams of the final phenolic resole foamable composition was immediately poured onto the cardboard in s-shaped fashion as shown in FIG. 1B. The cardboard was folded over the top of the foamable mixture and immediately put into the mold. The mold was closed and all clamps put in place and tightened. The mold with the foamable composition was placed in a 150° F. oven for 4 minutes. After removing from the oven, the foam was removed from the mold and weighed. The foam was allowed to stand for 24 hours before cutting samples for evaluation of foam properties.

Figure 6:
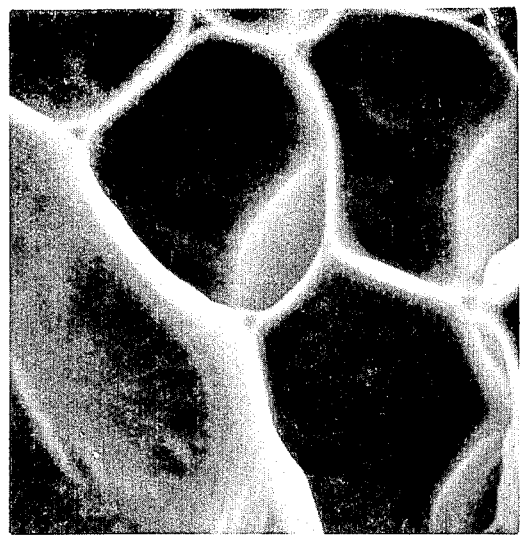
FIGS. 6-35 are scanning electron photomicrographs (SEM) showing the cells and cell walls of phenolic foams that are representative of the present invention and that are illustrative of the present invention. All SEMs are of 400× magnification, unless otherwise stated.

The cured foam contained 100 percent closed celles as measured using an air pyconometer according to test ASTM D-2856-70 and had a density of about 3.25 pounds per cubic foot (52 kg/cu. meter). The foam has an initial k factor of 0.135 before equilibration. The SEM of this foam is shown in FIG. 6. This SEM shows that the cell walls of the foam are substantially free of ruptures, perforation and cracks and that the cell walls are thick.

The k factors of the foam upon aging are set forth in Table I and also illustrate that the phenolic foam has entrapped the blowing agent and held the blowing agent over time. Accordingly, the cell walls are thick and substantially free of ruptures, perforations and cracks.

TABLE I

| Aging Period | k Factor |
|---|---|
| 10 days | 0.123 |
| 30 days | 0.122 |
| 90 days | 0.113 |
| 120 days | 0.113 |
| 280 days | 0.118 |

EXAMPLE 14

A phenolic resole feed was prepared by mixing 74.6 parts of the phenolic resole prepared as in Example 2 with 2.4 parts of L-7003 silicone surfactant.

A catalyst of anhydrous toluene sulfonic acid/xylene sulfonic acid (ULTRA-TX catalyst from WITCO Chemical) was used.

The phenolic resole feed composition, catalyst and a fluorocarbon blowing agent feed containing 6 parts of 1,1,2-trichloro-1,2,2-trifluoroethane, 6 parts of trichloromonofluoromethane and 1 part of L-7003 silicone surfactant were separately fed to and mixed in a distribution device of a phenolic foam machine as illustrated schematically in FIG. 2.

The phenolic resole feed composition, catalyst, and blowing agent feed composition were kept at temperatures in the ranges, respectively, of 9.4° C. to 12.2° C., 0.5° C. to 2.8° C., and −3° C. to 1.1° C. prior to mixing in the distribution device.

The foamable composition was applied at a temperature of about 30° C. continuously for six hours to a lower facing sheet of aluminum coated cardboard moved by the lower conveyor. An upper facing sheet of the same material and side papers of polyethylene coated kraft were fed to the machine just ahead of the curing cavity as illustrated in FIGS. 2 and 3.

The relative amounts of resole feed, catalyst, and blowing agent feed in the foamable composition were determined at eight times during the total six hours and are as reported in the following table.

TABLE II

| Time Number | Total Time Elapsed | Parts Resole Feed | Parts Catalyst | Parts Blowing Agent Feed |
|---|---|---|---|---|
| 1. | 15 mins. | 76 | 12.8 | 11.2 |
| 2. | 45 mins. | 76 | 13.0 | 11.0 |
| 3. | 61 mins. | 76 | 13.0 | 11.0 |
| 4. | 101 mins. | 76 | 13.8 | 10.2 |
| 5. | 170 mins. | 76 | 13.6 | 10.4 |
| 6. | 255 mins. | 76 | 13.8 | 10.2 |
| 7. | 315 mins. | 76 | 13.8 | 10.2 |
| 8. | 360 mins. | 76 | 13.8 | 10.2 |

The foamable composition was applied to the lower facing material and the conveyor speed adjusted such that once the foam had expanded to substantially fill the curing cavity, further expansion was prevented and pressure was generated within the curing cavity.

A pressure measurement, taken in the curing cavity after about every 30 minutes during the run at about ¾ of the way from the entrance of the curing cavity, indicated a gauge pressure generated by the foam within the cavity of 4–7 pounds per square inch. Temperature measurements of the foam just after exiting the curing cavity were taken during four times during the run and ranged from 72° C. to 82° C.

Figure 7:
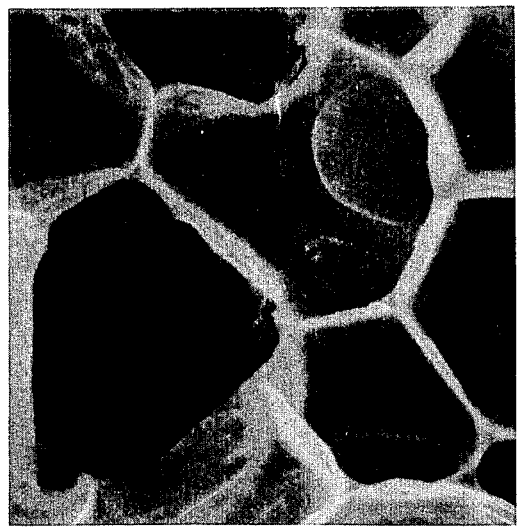

Product foam samples were taken every hour. The initial k factors, k factors after aging, and core densities of the foam samples are shown in Table III. FIG. 7 is a scanning electron photomicrograph of the phenolic foam prepared in this example. The SEM clearly shows that the cell walls are substantially free of ruptures, perforations and cracks. This is also shown by the k factor data which also shows that fluorocarbon was entrapped by the cells.

TABLE III

| Sample No. | Initial "k" | After 45 Days "k" | Core Density (pcf) |
|---|---|---|---|
| 1 | 0.161 | 0.118 | 2.642 |
| 2 | 0.158 | 0.114 | 2.593 |
| 3 | 0.164 | 0.115 | 2.814 |
| 4 | 0.160 | 0.114 | 2.62 |
| 5 | 0.171 | 0.115 | 2.87 |
| 6 | 0.168 | 0.121 | 2.76 |

Sample number one was tested after a period of one year and found to still have a k factor of 0.118.

EXAMPLE 15

A phenolic foam was prepared in the laboratory in a pint-size tin can as follows.

Figure 8:

First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L7003). This fluorocarbon blowing agent mixture was put in an ice bath and cooled to 50° F.–55° F. Then 221 grams of a phenolic resole prepared as in Example 1 was mixed with the high speed air mixer with 2.4 parts (8.0 grams) of silicone surfactant L-7003 in the tin can. The fluorocarbon blowing agent/surfactant premix was then mixed with the phenolic resole/surfactant premix. This mixture of phenolic resole, blowing agent and surfactant was cooled in the ice bath to 50° F.–55° F. Then 66 grams of a catalyst mixture of phenol sulfonic acid and methane sulfonic acid in a weight ratio of 5/3 containing 33 percent by weight water was weighed into a beaker and cooled to 40° F.–45° F. The acid catalyst was then mixed into the can with the phenolic resole, blowing agent and surfactant mixture at high rpm for 10–15 seconds. The can with the foamable composition was placed in a 150° F. oven for four minutes. After removing from the oven, the foam was allowed to stand for 24 hours before cutting samples for evaluation of foam properties. The foam of this example is shown in FIG. 8.

The SEM clearly shows that the cell walls contain many perforations. In addition, the SEM clearly shows the desirability of preparing the phenolic foam in a substantially closed mold capable of withstanding the pressure exerted by the foaming composition since most of the cell walls of the foam are ruptured. The initial k factor of this foam was about 0.22, which also shows that the cell walls are ruptured and/or contain perforations since no fluorocarbon agent was retained in the foam.

EXAMPLE 16

A phenolic foam was prepared in the laboratory using the laboratory mold illustrated in FIGS. 1A and 1B. The mold was made with ½-inch thick aluminum bars for the sides and ¼-inch thick aluminum plates for the top and bottom and had inside dimensions of 9⅜"×13"×2".

The mold was coated with a mold release agent and preheated in a 150° F. oven. A piece of dry corrugated cardboard of about 9⅜" by 28" was dried in a 150° F. oven for about 10–15 minutes. While the mold and cardboard were in the oven, the phenolic resin foamable composition was prepared as follows. First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L-5340). This fluorocarbon blowing agent mixture was put in an ice bath and cooled to 50°–66° F. Then 71.6 parts (237.8 grams) of an aqueous phenolic resole prepared as in Example 3 was mixed with the high speed air mixer with 2.4 parts (8.0 grams) of silicone surfactant L-5340 and 3 parts (10 grams) of urea. The fluorocarbon blowing agent/surfactant premix was then mixed with the phenolic resole/surfactant premix. This mixture of phenolic resole, blowing agent and surfactant was cooled in the ice bath to 50°–55° F. Then 12 parts (39.8 grams) of an anhydrous aryl sulfonic acid comprising 65 percent by weight toluene sulfonic acid and 35 percent by weight xylene sulfonic acid was weighed into a syringe and cooled to 40°–45° F. The cardboard and mold were removed from the oven. The anhydrous toluene/xylene sulfonic acid mixture was then mixed with the phenolic resole, blowing agent and surfactant mixture at high rpm for 10–15 seconds. Then 210 grams of the final phenolic resole foamable composition was immediately poured onto the cardboard in s-shaped fashion as shown in FIG. 1B. The cardboard was folded over the top of the foamable mixture and immediately put into the mold. The mold was closed and all clamps put in place and tightened. The mold with the foamable composition was placed in a 150° F. oven for 4 minutes. After removing from the oven, the foam was removed from the mold and weighed. The foam was allowed to stand for 24 hours before cutting samples for evaluation of foam properties.

The cured foam contained 100 percent closed cells as measured using an air pyconometer according to test ASTM D-2856-70 and had a density of about 3.25 pounds per cubic foot (52 kg/cu. meter). The foam has an initial k factor of 0.14 before equilibration. The SEM of this foam is shown in FIG. 9. The SEM clearly shows that the cell walls are thick and free of ruptures, cracks and perforations. This is also illustrated by the k factor data which also shows that the fluorocarbon blowing agent was entrapped in the cells.

The ks factor of the foam upon aging are set forth in the following table and shows tha the blowing agent was entrapped in the foam.

| Aging Period | k Factor |
|---|---|
| 10 days | 0.117 |
| 30 days | 0.117 |
| 60 days | 0.118 |
| 90 days | 0.114 |
| 150 days | 0.117 |

EXAMPLE 17

A phenolic foam was prepared in accordance with the procedure set forth in Example 16 except the phenolic resole that was used was the phenolic resole prepared as in Example 4.

Figure 10:

The SEM of this foam is shown as FIG. 10. The SEM shows that the cell walls are free from cracks, perforations and ruptures. The initial k factor of this foam was 0.120, which shows that the foam entrapped the blowing agent.

EXAMPLE 18

A phenolic foam was prepared in accordance with the procedure set forth in Example 16 except the phenolic resole that was used was the phenolic resole of Example 5.

The SEM of this foam is shown as FIG. 11. The SEM shows that some of the cell walls are ruptured and some of the cell walls are thin and cracked. This example illustrates the necessity of having a resole with the molecular weight characteristics of the present invention. This foam had an initial k factor of 0.22.

EXAMPLE 19

A phenolic foam was prepared in accordance with the procedure set forth in Example 16 except the phenolic resole that was used was the phenolic resole of Example 6.

Figure 12:
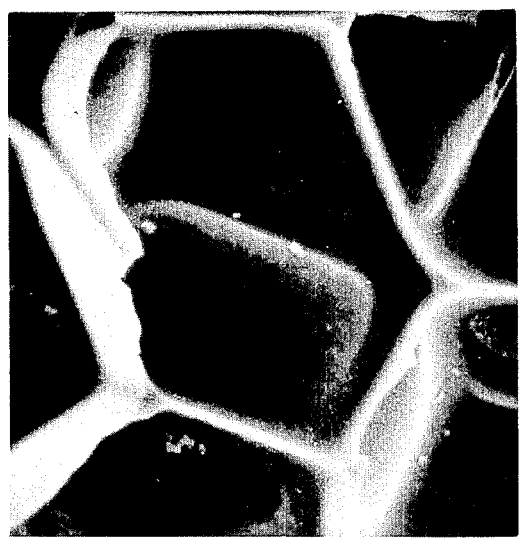

The SEM of this foam is shown as FIG. 12. The SEM shows that the cell walls are substantially free of cracks, ruptures and perforations. The foam had an initial k factor of 0.138 and a k factor after 90 days of 0.138, which shows that the blowing agent was entrapped in the foam.

EXAMPLE 20

A phenolic foam was prepared in accordance with the procedure set forth in Example 16 except the phenolic resole that was used was the phenolic resole of Example 7.

Figure 13:
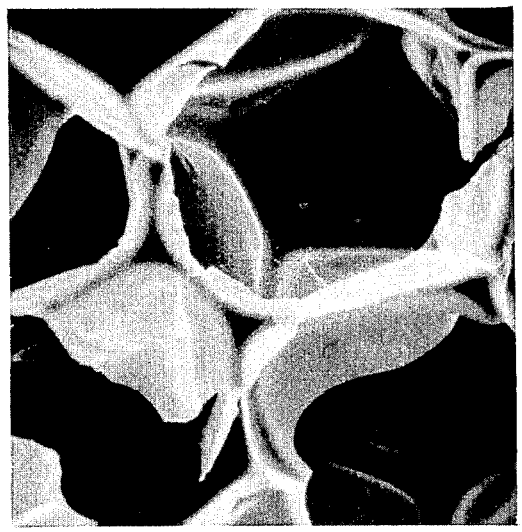

The SEM of this foam is shown as FIG. 13. The SEM shows that the cell walls are free of cracks, ruptures and perforations. The foam had a k factor after 180 days of 0.118, which clearly shows that the foam entrapped the blowing agent.

EXAMPLE 21

A phenolic foam was prepared in accordance with the procedure set forth in Example 16 except the phenolic resole that was used was the phenolic resole of Example 8.

Figure 14:
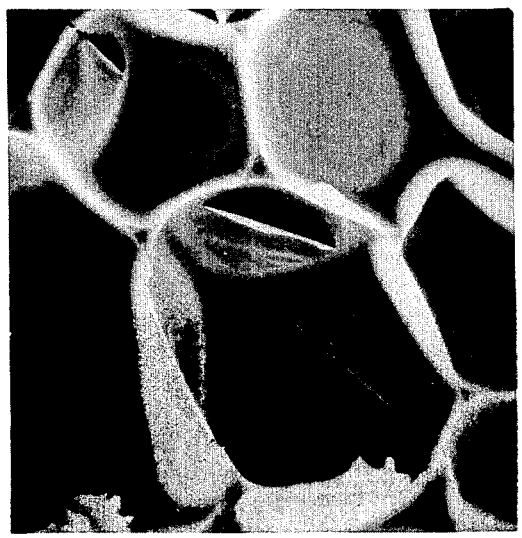

The SEM of this foam is shown as FIG. 14. The SEM shows that many of the cell walls are ruptured or thin and cracked. The foam had an initial k factor of 0.22, which shows that no blowing agent was entrapped in the foam.

EXAMPLE 22

A phenolic foam was prepared in accordance with the procedure set forth in Example 16 except the phenolic resole that was used was the phenolic resole of Example 9.

Figure 15:
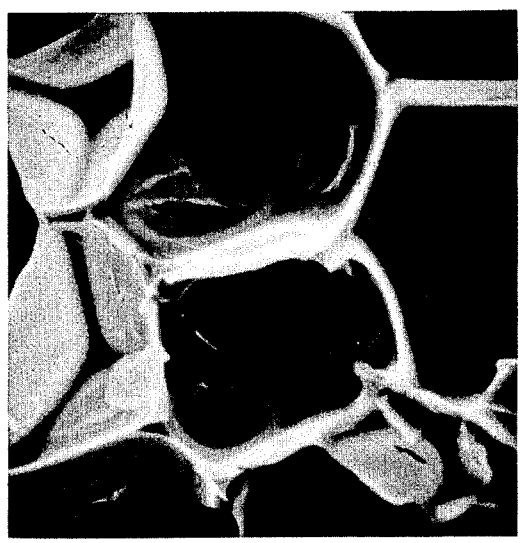

The SEM of this foam is shown as FIG. 15. The SEM shows many of the cell walls are ruptured. The foam had an initial k factor of 0.206 and a k factor after 30 days of 0.224, which shows that very little blowing agent was originally entrapped and even this small amount was lost over time.

EXAMPLE 23

A phenolic foam was prepared in accordance with the procedure set forth in Example 16 except the phenolic resole that was used was the phenolic resole of Example 10.

Figure 16:
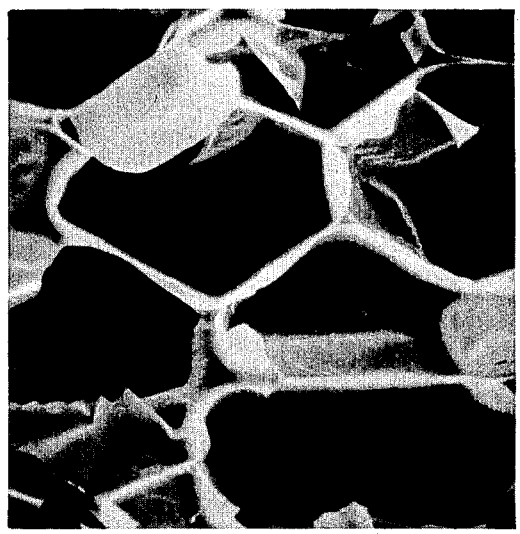

The SEM of this form is shown as FIG. 16. The SEM shows that many of the cell walls were ruptured even though a closed mold was used. This illustrates the necessity of using a resole having the molecular weights and dispersivity of this invention to make a foam free of ruptures even in a closed mold. The foam had an initial k factor of 0.22.

EXAMPLE 24

A phenolic foam was prepared in accordance with the procedure set forth in Example 16 except the phenolic resole that was used was the phenolic resole of Example 11.

Figure 17:

The SEM of this foam is shown as FIG. 17. The SEM shows that the cell walls are free of cracks, ruptures and perforations. The foam had an initial k factor of 0.127 and a k factor after 30 days of 0.118. This example illustrates that the method of preparing the resole is not important as long as the required molecular weights and dispersivsity are obtained.

EXAMPLE 25

A phenolic foam was prepared in accordance with the procedure set forth in Example 16 except the phenolic resole that was used was the phenolic resole of Example 12.

Figure 18:

The SEM of this foam is shown as FIG. 18. The SEM shows that most of the cell walls are ruptured. The foam had an initial k factor of 0.25. This example illustrates the necessity of using primarily phenol in preparing the phenol formaldehyde resole.

EXAMPLE 26

A phenolic resole was prepared in accordance with Example 2 except the reaction was stopped when a bubble viscosity of 80 seconds was achieved. This resole had 15.1 percent water, 3.1 percent formaldehyde, and 3.2 percent phenol. This resole had a weight average molecular weight of 1504, a number average molecular weight of 591, and a dispersivity of 2.55.

A foam was prepared from this resole following the procedures set forth in Example 16.

Figure 19:
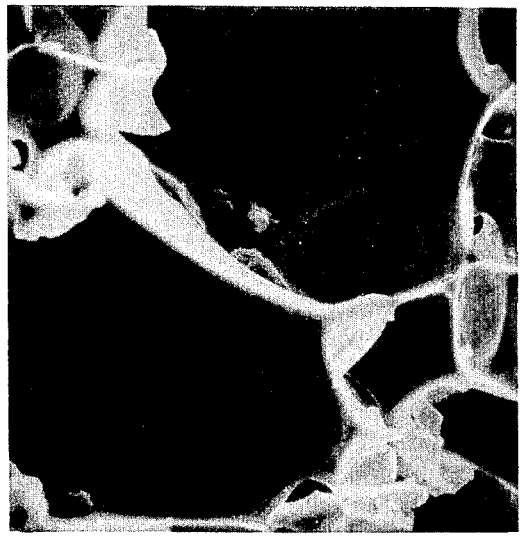

The SEM of this foam is shown as FIG. 19. The SEM shows that the cell walls are free of cracks, ruptures and perforations. This example illustrates the desirability of using the preferred resoles. This foam had an initial k factor of 0.121.

EXAMPLE 27

A phenolic foam was prepared in the laboratory using the laboratory mold illustrated in FIGS. 1A and 1B. The mold was made with ⅛-inch thick aluminum bars for the sides and ¼-inch thick aluminum plates for the top and bottom and had inside dimensions of 9⅜"×13"×2". The phenolic resole used in this example was a commercially available phenolic resole from Georgia Pacific sold as GP-X-2014/945. This resole as received had 7 percent by weight water. An additional 5 percent by weight water was added to give the resole a water content of 12 percent by weight. This resin had a weight average molecular weight of 674, a number average molecular weight of 398.5, and a dispersivity of 1.69.

Figure 20:

The mold was coated with a mold release agent and preheated in a 150° F. oven. A piece of dry corrugated cardboard of about 9⅜" by 28" was dried in a 150° C. oven for about 10-15 minutes. While the mold and cardboard were in the oven, the phenolic resin foamable composition was prepared as follows. First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L-7003). This fluorocarbon blowing agent mixture was put in an ice bath and cooled to 50°-55° F. Then 76.6 parts (254.3 grams) of the phenolic resole was mixed with the high speed air mixer with 2.4 parts (8.0 grams) of silicone surfactant L-7003. The fluorocarbon blowing agent/surfactant premix was then mixed with the phenolic resole/surfactant premix. This mixture of phenolic resole, blowing agent and surfactant was cooled in the ice bath to 50°-55° F. Then 10 parts of an anhydrous toluene sulfonic/xylene sulfonic acid mixture (ULTRA-TX acid from WITCO Chemical) was weighed into a syringe and cooled to 40°-45° F. The cardboard and mold were removed from the oven. The anhydrous aryl sulfonic acid catalyst was then mixed with the phenolic resole, blowing agent and surfactant mixture at high rpm for 10-15 seconds. Then 210 grams of the final phenolic resole foamable composition was immediately poured onto the cardboard in s-shaped fashion as shown in FIG. 1B. The cardboard was folded over the top of the foamable mixture and immediately put into the mold. The mold was closed and all clamps put in place and tightened. The mold with the foamable composition was placed in a 150° F. oven for 4 minutes. After removing from the oven, the foam was removed from the mold and weighed. The foam was allowed to stand for 24 hours before cutting samples for evaluation of foam properties. This foam had a k factor of 0.22. The scanning electron photomicrograph of this phenolic foam is shown in FIG. 20. The SEM shows that the foam has cell walls which are substantially free of perforations. However, the SEM also shows that many of the cell walls are ruptured or are very thin with cracks. This example illustrates the necessity of using resoles having the higher molecular weights and dispersivity of the present invention.

EXAMPLE 28

A phenolic foam was prepared in the laboratory using the laboratory mold illustrated in FIGS. 1A and 1B. The mold was made with ⅛-inch thick aluminum bars for the sides and ¼-inch thick aluminum plates for the top and bottom and had inside dimensions of 9⅜"×13"×2".

The mold was coated with a mold release agent and preheated in a 150° F. oven. A piece of dry corrugated cardboard of about 9⅜" by 28" was dried in a 150° oven for about 10-15 minutes. While the mold and cardboard were in the oven, the phenolic resin foamable composition was prepared as follows. First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L-5340). This fluorocarbon blowing agent mixture was put in an ice bath and cooled to 50°-66° F. Then 69.6 parts (231.1 grams) of a phenolic resole prepared as in Example 3 was mixed with the high speed air mixer with 2.4 parts (8.0 grams) of silicone surfactant L-5340 and 3 parts (10 grams) of urea. The fluorocarbon blowing agent/surfactant premix was then mixed with the phenolic resole/surfactant premix. This mixture of phenolic resole, blowing agent and surfactant was cooled in the ice bath to 50°-55° F. Then 14 parts (46.4 grams) of liquid anhydrous ethylbenzene sulfonic acid was weighed into a syringe and cooled to 40°-45° F. The cardboard and mold were removed from the oven. The anhydrous ethylbenzene sulfonic acid catalyst was then mixed with the phenolic resole, blowing agent and surfactant mixture at high rpm for 10-15 seconds. Then 210 grams of the final phenolic resole foamable composition was immediately poured onto the cardboard in s-shaped fashion as shown in FIG. 1B. The cardboard was folded over the top of the foamable mixture and immediately put into the mold. The mold was closed and all clamps put in place and tightened. The mold with the foamable composition was placed in a 150° F. oven for 4 minutes.

After removing from the oven, the foam was removed from the mold and weighed. The foam was allowed to stand for 24 hours before cutting samples for evaluation of foam properties.

Figure 21:

The cured foam contained 100 percent closed cells as measured using an air pyconometer according to test ASTM D-2856-70 and had a density of about 3.25 pounds per cubic foot (52 kg/cu. meter). The foam has an initial k factor of 0.12 and a k factor after 80 days of 0.115. The SEM of this foam is shown in FIG. 21. The SEM shows that the cell walls are substantially free of cracks, ruptures and perforations which is also borne out by the k factor data.

EXAMPLE 29

A phenolic foam was prepared in the laboratory using the laboratory mold illustrated in FIGS. 1A and 1B. The mold was made with ½-inch thick aluminum bars for the sides and ¼-inch thick aluminum plates for the top and bottom and had inside dimensions of 9⅜"×13"×2".

The mold was coated with a mold release agent and preheated in a 150° F. oven. A piece of dry corrugated cardboard of about 9¾" by 28" was dried in a 150° F. oven for about 10-15 minutes. While the mold and cardboard were in the oven, the phenolic resin foamable composition was prepared as follows. First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L-5340). This fluorocarbon blowing agent mixture was put in an ice bath and cooled to 50°-66° F. Then 71.6 parts (237.8 grams) of a phenolic resole preared as in Example 4 was mixed with the high speed air mixer with 2.4 parts (8.0 grams) of silicone surfactant L-5340 and 3 parts (10 grams) of urea. The fluorocarbon blowing agent/surfactant premix was then mixed with the phenolic resole/surfactant premix. This mixture of phenolic resole, blowing agent and surfactant was cooled in the ice bath to 50°-55° F. Then 12 parts (39.8 grams) of anhydrous liquid cumene sulfonic acid was weighed into a syringe and cooled to 40°-45° F. The cardboard and mold were removed from the oven. The anhydrous cumene sulfonic catalyst was then mixed with the phenolic resole, blowing agent and surfactant mixture at high rpm for 10-15 seconds. Then 210 grams of the final phenolic resole foamable composition was immediately poured onto the cardboard in s-shaped fashion as shown in FIG. 1B. The cardboard was folded over the top of the foamable mixture and immediately put into the mold. The mold was closed and all clamps put in place and tightened. The mold with the foamable composition was placed in a 150° F. oven for 4 minutes. After removing from the oven, the foam was removed from the mold and weighed. The foam was allowed to stand for 24 hours before cutting samples for evaluation of foam properties.

Figure 22:
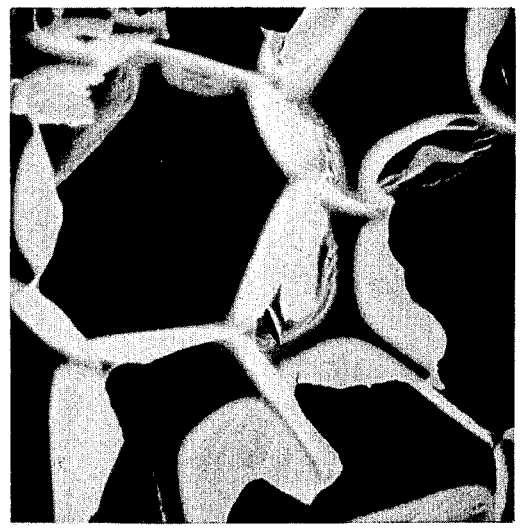

The cured foam contained 100 percent closed cells as measured using an air pyconometer according to test ASTM D-2856-70 and had a density of about 3.25 pounds per cubic foot (52 kg/cu. meter). The foam has an initial k factor of 0.156 and a k factor after 10 days of 0.145. The SEM of this foam is shown in FIG. 22 and shows that the cell walls are free of cracks, ruptures and perforations.

EXAMPLE 30

A phenolic foam was prepared in accordance with the procedures set forth in Example 29 except liquid anhydrous xylene sulfonic acid was used.

Figure 23:
Figure 24:

The SEM of this foam is shown in FIG. 23 and clearly illustrates that the cell walls are substantially free of cracks, ruptures and perforations. The foam had an initial k factor of 0.158.

EXAMPLE 31

A phenolic foam was prepared in accordance with the procedure set forth in Example 29 except liquid anhydrous diethylbenzene sulfonic acid was used.

The SEM of this foam is shown in FIG. 25 and clearly shows that the cell walls are substantially free of ruptures, cracks and perforations. The foam had an initial k factor of 0.144, a k factor after 90 days of 0.121 and a k factor after 120 days of 0.125.

EXAMPLE 32

A phenolic foam was prepared in accordance with the procedure set forth in Example 29 except that 69.6 parts (231.2 grams) of the resole was used and 14 parts calculated on an anhydrous basis (46.4 grams) of a catalyst that was a toluene sulfonic/xylene sulfonic acid containing 10 percent by weight water. The weight ratio of toluene to xylene sulfonic acid was 65/35.

The SEMs of this foam are shown as FIGS. 25 and 26. FIG. 25 shows that the cell walls of the foam contain perforations. The magnitude of the number of perforations is shown by FIG. 26 which has magnification of 2000X. The foam had an initial k factor of 0.22. This example illustrates the effect of water in the catalyst. Even the preferred catalyst will not prevent perforations and ruptures when the catalyst contains this much water. The SEMs also show how water in the catalyst causes ruptured cells and cracks in the cell walls.

EXAMPLE 33

A phenolic foam was prepared in accordance with the procedure set forth in Example 32 except that the toluene sulfonic/xylene sulfonic acid mixture contained only 5 percent by weight water.

The SEM of this foam is shown as FIG. 27. FIG. 27 shows that the cell walls are substantially free of perforations. However, the cell walls are ruptured. Accordingly, the preferred catalyst will substantially reduce perforations if it contains 5 percent water but the water still adversely affects the foam by rupturing the cell walls. This foam had a k factor of 0.22.

EXAMPLE 34

A phenolic foam was prepared in accordance with the procedure set forth in Example 32 except that the toluene sulfonic/xylene sulfonic acid mixture contained only 2 percent by weight water.

The SEM of this foam is shown as FIG. 28 and clearly shows that the cell walls are not only free of perforations but also are free from ruptured or cracked cell walls. This foam had a k factor of 0.120.

EXAMPLE 35

A phenolic foam was prepared in accordance with the procedure set forth in Example 13 except 80.6 parts (267.6 grams) of the resin was used and 6 parts (19.9 grams) of the catalyst was used. The catalyst was phosphorous pentoxide, which was an anhydrous solid.

Figure 29:

The SEM of this foam at 600X is shown as FIG. 29 which clearly indicates the presence of large perforations in the cell walls. Even though phosphorous pentoxide is an anhydrous catalyst it will not prevent perforations or ruptures since it does not have the ability to change the compatibility of the resole with water. This foam had an initial k factor of 0.22.

EXAMPLE 36

A phenolic foam was prepared in accordance with the procedure set forth in Example 13 except the catalyst was liquid anhydrous polyphosphoric acid.

Figure 30:
Figure 31:

The SEM of this foam at 440X is shown as FIG. 30 which clearly shows the presence of ruptures and large perforations in the cell walls. Even though the polyphosphoric acid was anhydrous, it did not prevent ruptures and perforations in the cell walls since it does not have the ability to change the compatibility of the resole with water. This foam had an initial k factor of 0.24.

EXAMPLE 37

A phenolic foam was prepared in accordance with the procedure set forth in Example 29 except additional water was added to the resole making the resole about 27.5 percent water. The catalyst used was the preferred 65/35 anhydrous toluene sulfonic/xylene sulfonic acid.

The SEM of this foam at 1000X is shown as FIG. 1 and shows that there are perforations in the cell walls. This illustrates that even the preferred catalyst will not prevent perforations when high amounts of water are present in the foamable compositions. It is believed that the perforations in this foam could be eliminated if the amount of catalyst was increased to around 18-20 parts; however, this high concentration of catalyst may cause the foaming and curing to proceed too rapidly to entrap the blowing agent.

EXAMPLE 38

A phenolic foam was prepared in accordance with the procedure set forth in Example 37 except water was vacuum stripped from the resole at room temperature until the resole was 12 percent by weight water.

Figure 32:
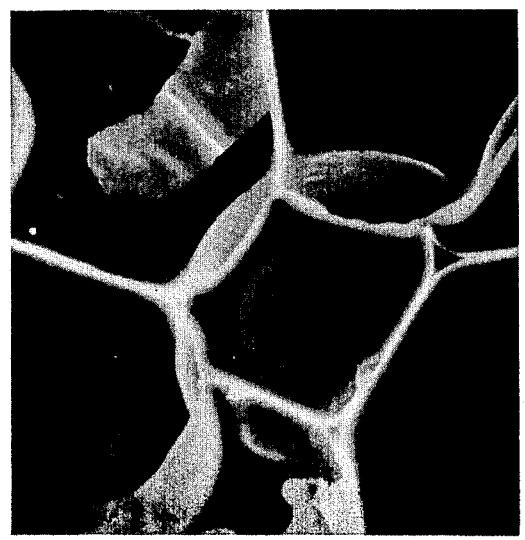

The SEM of this foam is shown as FIG. 32 and shows that the cell walls are free of cracks, ruptures and perforations. The foam had an initial k factor of 0.142 and a k factor after 90 days of 0.144.

EXAMPLE 39

A phenolic foam was prepared as in Example 16 except the catalyst was xylene sulfonic acid containing 10 percent by weight water.

Figure 33:
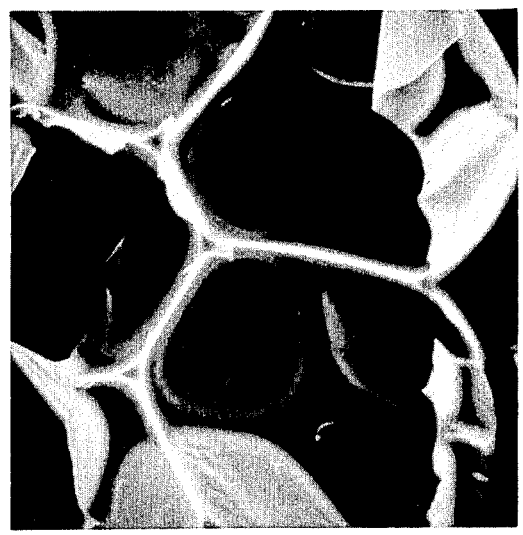

The SEM of this foam is shown as FIG. 33. FIG. 33 shows that the cell walls of the foam are free of perforations but are ruptured. This foam had an initial k factor of 0.22. This example illustrates that even though water can be tolerated in this catalyst at concentrations around 10 percent for preventing perforations, these high levels will not prevent water from rupturing the cell walls.

EXAMPLE 40

A phenolic foam was prepared in accordance with Example 15 except the resole was prepared in accordance with Example 3 and the ratio of ingredients was as in Example 17.

The SEM of this foam is shown at 200X as FIG. 34 and at 400X as FIG. 35. FIGS. 34 and 35 show that the cell walls are ruptured. This example shows the necessity of having a substantially closed mold in order to prevent most of the cell walls from being ruptured. A comparison of this SEM with the other SEMs, particularly FIGS. 27 and 33, also shows the difference in rupturing caused by lack of restraining pressure and rupturing caused by water or rupturing caused by a too reactive resole.

We claim:

1. An improved foamable phenolic resole composition containing at least about 5 percent by weight water comprising aqueous phenol formaldehyde resole, surfactant, blowing agent, and acid catalyst, wherein the improvement comprises a phenol formaldehyde resole having a molar ratio of formaldehyde to phenol of from about 1.7:1 to about 2.3:1, a weight average molecular weight greater than about 800, a number average molecular weight greater than about 350, and a dispersivity greater than about 1.7 and wherein the acid catalyst is an anhydrous aryl sulfonic acid having a pKa of less than about 2.0 and which reduces the compatibility of the phenolic resole with water sufficiently enough to prevent perforations and ruptures in cell walls of phenolic foam made from the composition and wherein the anhydrous aryl sulfonic acid is present in concentrations of at least about 6 percent by weight.

2. An improved foamable phenolic resole composition as in claim 1 wherein the phenolic resole has a weight average molecular weight between about 950 and 1500.

3. An improved foamable phenolic resole composition as in claims 1 or 2 wherein the phenolic resole has a number average molecular weight between about 400 and 600.

4. An improved foamable phenolic resole composition as in claims 1 or 2 wherein the phenolic resole has a dispersivity of from about 1.8 to 2.6.

5. An improved foamable phenolic resole composition as in claims 1 or 2 wherein the anhydrous aryl sulfonic acid is selected from benzene sulfonic acid, toluene sulfonic acid, xylene sulfonic acid and mixtures thereof.

6. An improved foamable phenolic resole composition as in claim 3 wherein the anhydrous aryl sulfonic acid is selected from benzene sulfonic acid, toluene sulfonic acid, xylene sulfonic acid and mixtures thereof.

7. An improved foamable phenolic resole composition as in claims 1 or 2 wherein the anhydrous aryl sulfonic acid is a mixture of from 50 to 90 percent by weight toluene sulfonic acid and from 10 to 50 percent by weight xylene sulfonic acid.

8. An improved foamable phenolic resole composition as in claim 3 wherein the anhydrous aryl sulfonic acid is a mixture of from 50 to 90 percent by weight toluene sulfonic acid and from 10 to 50 percent by weight xylene sulfonic acid.

9. An improved foamable phenolic resole composition containing at least about 5 percent by weight water comprising aqueous phenol formaldehyde resole, surfactant, blowing agent, and acid catalyst wherein the improvement comprises a phenol formaldehyde resole having a molar ratio of formaldehyde to phenol of from about 1.75:1 to about 2.25:1, a weight average molecular weight greater than about 800, a number average molecular weight greater than about 350, and a dispersivity greater than about 1.7 and wherein the acid catalyst is an anhydrous aryl sulfonic acid having a pKa of less than about 2.0 and which reduces the compatibility of the phenolic resole with water sufficiently enough to prevent perforations and ruptures in cell walls of phenolic foam made from the composition and wherein the anhydrous aryl sulfonic acid is present in concentrations of at least about 6 percent by weight.

10. An improved foamable phenolic resole composition as in claim 9 wherein the phenolic resole has a weight average molecular weight between about 950 and 1500.

11. An improved foamable phenolic resole composition as in claims 9 or 10 wherein the phenolic resole has a number average molecular weight between about 400 and 600.

12. An improved foamable phenolic resole composition as in claims 9 or 10 wherein the phenolic resole has a dispersivity of from about 1.8 to 2.6.

13. An improved foamable phenolic resole composition as in claims 9 or 10 wherein the anhydrous aryl sulfonic acid is selected from benzene sulfonic acid, toluene sulfonic acid, xylene sulfonic acid and mixtures thereof.

14. An improved foamable phenolic resole composition as in claim 12 wherein the anhydrous aryl sulfonic acid is selected from benzene sulfonic acid, toluene sulfonic acid, xylene sulfonic acid and mixtures thereof.

15. An improved formable phenolic resole composition as in claims 9 or 10 wherein the anhydrous aryl sulfonic acid is a mixture of from 50 to 90 percent by weight toluene sulfonic acid and from 10 to 50 percent by weight xylene sulfonic acid.

16. An improved foamable phenolic resole composition as in claim 12 wherein the anhydrous aryl sulfonic acid is a mixture of from 50 to 90 percent by weight toluene sulfonic acid and from 10 to 50 percent by weight xylene sulfonic acid.

17. An improved fomable phenolic resole composition containing at least about 5 percent by weight water comprising aqueous phenol formaldehyde resole, surfactant, blowing agent, and acid catalyst, wherein the improvement comprises a phenol formaldehyde resole having a molar ratio of formaldehyde to phenol of about 2:1, a weight average molecular weight greater than about 800, a number average molecular weight greater than about 350, and a dispersivity greater than about 1.7 and wherein the acid catalyst is an anhydrous aryl sulfonic acid having a pKa of less than about 2.0 and which reduces the compatability of the phenolic resole with water sufficiently enough to prevent ruptures and perforations in cell walls of phenolic foam made from the composition and wherein the anhydrous aryl sulfonic acid is present in concentrations of at least about 6 percent by weight.

18. An improved foamable phenolic resole composition as in claim 17 wherein the phenolic resole has a weight average molecular weight between about 950 and 1500.

19. An improved foamable phenolic resole composition as in claims 17 or 18 wherein the phenolic resole has a number average molecular weight between about 400 and 600.

20. An improved foamable phenolic resole composition as in claim 17 or 18 wherein the phenolic resole has a dispersivity of from about 1.8 to 2.6.

21. An improved foamable phenolic resole composition as in claim 17 or 18 wherein the anhydrous aryl sulfonic acid is selected from benzene sulfonic acid, toluene sulfonic acid, xylene sulfonic acid and mixtures thereof.

22. An improved foamable phenolic resole composition as in claim 19 wherein the anhydrous aryl sulfonic acid is selected from benzene sulfonic acid, toluene sulfonic acid, xylene sulfonic acid and mixtures thereof.

23. An improved foamable phenolic resole composition as in claim 17 or 18 wherein the anhydrous aryl sulfonic acid is a mixture of from 50 to 90 percent by weight toluene sulfonic acid and from 10 to 50 percent by weight xylene sulfonic acid.

24. An improved foamable phenolic resole composition as in claim 19 wherein the anhydrous aryl sulfonic acid is a mixture of from 50 to 90 percent by weight toluene sulfonic acid and from 10 to 50 percent by weight xylene sulfonic acid.

25. An improved process for preparing phenolic foam comprising preparing a foamable phenolic resole composition containing at least about 5 percent by weight water comprising aqueous phenol formaldehyde resole, surfactant, blowing agent, and acid catalyst, and foaming and curing said composition in a substantially closed mold wherein the improvement comprises a phenol formaldehyde resole having a molar ratio of formaldehyde to phenol of from about 1.7:1 to about 2.3:1, a weight average molecular weight greater than about 800, a number average molecular weight greater than about 350 and a dispersivity greater than about 1.7 and wherein the acid catalyst is an anhydrous aryl sulfonic acid having a pKa of less than about 2.0 and which reduces the compatability of the phenolic resole with water sufficiently enough to prevent ruptures and perforations in cell walls of the phenolic foam and wherein the anhydrous aryl sulfonic acid is present in concentrations of at least about 6 percent by weight.

26. An improved process as in claim 25 wherein the phenolic resole has a weight average molecular weight between about 950 and 1500.

27. An improved process as in claims 25 or 26 wherein the phenolic resole has a dispersivitiy of from about 1.8 to 2.6.

28. An improved process as in claims 25 or 26 wherein the anhydrous aryl sulfonic acid is selected from benzene sulfonic acid, toluene sulfonic acid, xylene sulfonic acid and mixtures thereof.

29. An improved process as in claim 27 wherein the anhydrous aryl sulfonic acid is selected from benzene sulfonic acid, toluene sulfonic acid, xylene sulfonic acid and mixtures thereof.

30. An improved process as in claims 25 or 26 wherein the anhydrous aryl sulfonic acid is a mixture of from 50 to 90 percent by weight toluene sulfonic acid and from 10 to 50 percent by weight xylene sulfonic acid.

31. An improved process as in claim 27 wherein the anhydrous aryl sulfonic acid is a mixture of from 50 to 90 percent by weight toluene sulfonic acid and from 10 to 50 percent by weight xylene sulfonic acid.

32. An improved process for preparing phenolic foam comprising preparing a foamable phenolic resole composition containing at least about 5 percent by weight water comprising aqueous phenol formaldehyde resole, surfactant, blowing agent, and acid catalyst, and foaming and curing said composition in a substantially closed mold wherein the improvement comprises a phenol formaldehyde resole having a molar ratio of formaldehyde to phenol of from about 1.75:1 to about 2.25:1, a weight average molecular weight greater than about 800, a number average molecular weight greater than about 350 and a dispersivity greater than about 1.7 and wherein the acid catalyst is an anhydrous aryl sulfonic acid having a pKa of less than about 2.0 and which reduces the compatability of the phenolic resole with water sufficiently enough to prevent ruptures and perforations in cell walls of the phenolic foam and wherein the anhydrous aryl sulfonic acid is present in concentrations of at least about 6 percent by weight.

33. An improved process as in claim 32 wherein the phenolic resole has a weight average molecular weight between about 950 and 1500.

34. An improved process as in claims 32 or 33 wherein the phenolic resole has a dispersivity of from about 1.8 to 2.6.

35. An improved process as in claims 32 or 33 wherein the anhydrous aryl sulfonic acid is selected from benzene sulfonic acid, toluene sulfonic acid, xylene sulfonic acid and mixtures thereof.

36. An improved process as in claim 34 wherein the anhydrous aryl sulfonic acid is selected from benzene sulfonic acid, toluene sulfonic acid, xylene sulfonic acid and mixtures thereof.

37. An improved process as in claims 32 or 33 wherein the anhydrous aryl sulfonic acid is a mixture of from 50 to 90 percent by weight toluene sulfonic acid and from 10 to 50 percent by weight xylene sulfonic acid.

38. An improved process as in claim 34 wherein the anhydrous aryl sulfonic acid is a mixture of from 50 to 90 percent by weight toluene sulfonic acid and from 10 to 50 percent by weight xylene sulfonic acid.

39. An improved process for preparing phenolic foam comprising preparing a foamable phenolic resole composition containing at least about 5 percent by weight water comprising aqueous phenol formaldehyde resole, surfactant, blowing agent, and acid catalyst, and foaming and curing said composition in a substantially closed mold wherein the improvement comprises a phenol fomaldehyde resole having a molar ratio of formaldehyde to phenol of about 2:1, a weight average molecular weight greater than about 800, a number average molecular weight greater than about 350 and a dispersivity greater than about 1.7 and wherein the acid catalyst is an anhydrous aryl sulfonic acid having a pKa of less than about 2.0 and which reduces the compatability of the phenolic resole with water sufficiently enough to prevent ruptures and perforations in cell walls of the phenolic foam and wherein the anhydrous aryl sulfonic acid is present in concentrations of at least about 6 percent by weight.

40. An improved process as in claim 39 wherein the phenolic resole has a weight average molecular weight between about 950 and 1500.

41. An improved process as in claims 39 or 40 wherein the phenolic resole has a dispersivity of from about 1.8 to 2.6.

42. An improved process as in claims 39 or 40 wherein the anhydrous aryl sulfonic acid is selected from benzene sulfonic acid, toluene sulfonic acid, xylene sulfonic acid and mixtures thereof.

43. An improved process as in claim 41 wherein the anhydrous aryl sulfonic acid is selected from benzene sulfonic acid, toluene sulfonic acid, xylene sulfonic acid and mixtures thereof.

44. An improved process as in claim 39 or 40 wherein the anhydrous aryl sulfonic acid is a mixture of from 50 to 90 percent by weight toluene sulfonic acid and from 10 to 50 percent by weight xylene sulfonic acid.

45. An improved process as in claim 41 wherein the anhydrous aryl sulfonic acid is a mixture of from 50 to 90 percent by weight toluene sulfonic acid and from 10 to 50 percent by weight xylene sulfonic acid.

* * * * *